(12) United States Patent
Li et al.

(10) Patent No.: US 12,353,373 B2
(45) Date of Patent: Jul. 8, 2025

(54) AUTOMATIC DATA PURGE VERIFICATION

(71) Applicant: SAP SE, Walldorf (DE)

(72) Inventors: Fen Li, Shanghai (CN); Haipeng Wu, Shanghai (CN); Lei Wang, Shanghai (CN); Yunfeng Jiang, Shanghai (CN); Lai Wei, Shanghai (CN); Feng Zhang, Shanghai (CN)

(73) Assignee: SAP SE, Walldorf (DE)

( * ) Notice: Subject to any disclaimer, the term of this patent is extended or adjusted under 35 U.S.C. 154(b) by 38 days.

(21) Appl. No.: 18/378,003

(22) Filed: Oct. 9, 2023

(65) Prior Publication Data

US 2025/0117371 A1    Apr. 10, 2025

(51) Int. Cl.
  *G06F 16/20*    (2019.01)
  *G06F 16/215*   (2019.01)
(52) U.S. Cl.
  CPC ................................ *G06F 16/215* (2019.01)
(58) Field of Classification Search
  None
  See application file for complete search history.

(56) References Cited

U.S. PATENT DOCUMENTS

| 7,266,747 B2* | 9/2007 | Foss ...................... H03M 13/29 |
| | | 714/E11.041 |
| 9,361,304 B2* | 6/2016 | Hobart .................. G06F 16/125 |
| 2004/0215885 A1* | 10/2004 | Cargnoni ............ G06F 12/0897 |
| | | 711/134 |
| 2022/0292120 A1* | 9/2022 | Jiang ....................... G06F 16/27 |
| 2023/0093900 A1* | 3/2023 | Scope .................. H04L 9/0891 |
| | | 726/27 |

* cited by examiner

*Primary Examiner* — Belix M Ortiz Ditren
(74) *Attorney, Agent, or Firm* — SCHWEGMAN LUNDBERG & WOESSNER, P.A.

(57) ABSTRACT

Systems and methods described herein relate to the real-time verification of data purges. A first subprocess of a data purging process is executed to purge a plurality of data items. A system accesses purge result data providing an indication of a result of the first subprocess. The system determines, based on the purge result data, that the first subprocess was not executed in accordance with a purge policy associated with the data purging process. In response to determining that the first subprocess was not executed in accordance with the purge policy, the system adjusts a state of the data purging process. A second subprocess of the data purging process is then executed according to the adjusted state.

20 Claims, 12 Drawing Sheets

AUTOMATIC DATA PURGE VERIFICATION

TECHNICAL FIELD

The subject matter disclosed herein generally relates to data purging. More specifically, but not exclusively, the subject matter relates to the verification of data purging operations that are performed by a purging engine according to a purge policy.

BACKGROUND

Data purging is an important task in many business environments. For example, data purging operations can free up storage space, improve system speeds, reduce costs, better protect sensitive information, or ensure compliance with data regulations, such as the European Union's General Data Protection Regulation (GDPR). In some cases, a purge policy or data retention policy is implemented by a data purging system (e.g., a data purging system operating in a cloud-based storage environment). A purging engine of the data purging system then automatically performs a data purging process (e.g., on a recurring basis) to purge data items according to criteria and timing defined in the purge policy.

When deploying a purging engine in a data purging system, care should be taken to ensure that purging is performed accurately. Existing data purging systems may present reliability challenges in ensuring proper purging of data. For example, purging errors can inadvertently retain data items that should have been purged (e.g., preserve data items in storage in conflict with a purge policy or data regulations) or permanently and irrevocably destroy data items that should have been preserved.

BRIEF DESCRIPTION OF THE DRAWINGS

Some examples are shown for purposes of illustration and not limitation in the figures of the accompanying drawings. In the drawings, which are not necessarily drawn to scale, like numerals may describe similar components in different views or examples. To identify the discussion of any particular element or act more easily, the most significant digit or digits in a reference number refer to the figure number in which that element is first introduced.

DETAILED DESCRIPTION

Figure 1:
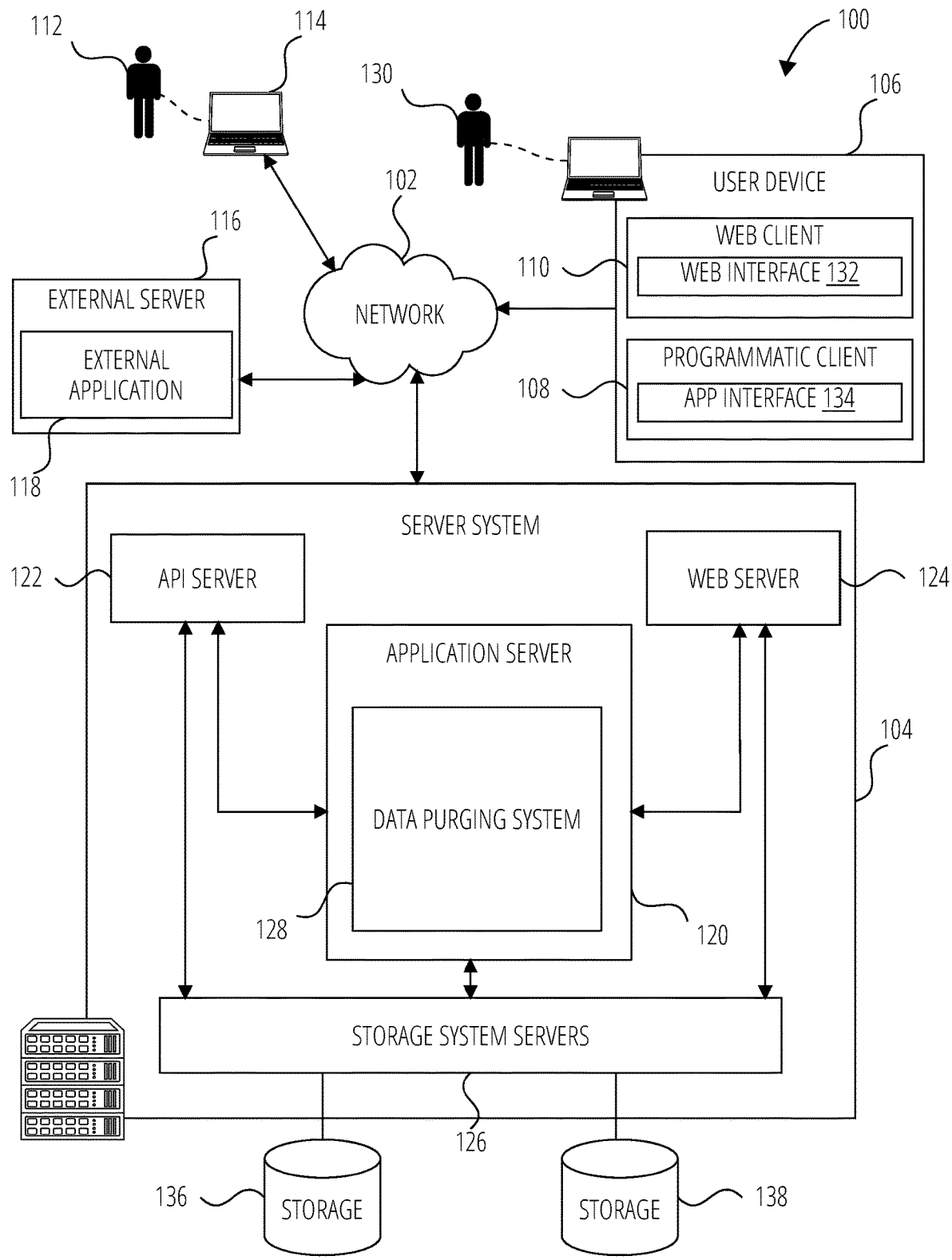
FIG. 1 is a diagrammatic representation of a network environment that includes a data purging system, according to some examples.

The term "data purging" generally refers to a process of deleting or removing data from a system or device. The term "soft purge," as used herein, refers to purging data in a reversible manner or in a manner that otherwise allows for recovery of the purged data. For example, a soft purge may involve marking a record in a table as "deleted," or transferring a file to a recycle bin from where it can be recovered. The term "hard purge," as used herein, refers to purging data in a permanent or irreversible manner. For example, a hard purge may involve removing a data item from all systems or devices, including backup systems or devices, in such a manner that the data item is not recoverable after the purging process (e.g., the hard purge cannot subsequently be reversed).

The term "data item," as used herein, refers to any unit, collection, or aggregation of data that can be stored digitally. A data item may comprise any type, structure, or format of data. Non-limiting examples of data items include a database record, a table, a file (e.g., a document, image, video, or audio file), a folder (e.g., a folder containing multiple files), an email message, a packet of raw data, a data object instance, a cell or row in a spreadsheet, a log entry or log file, or metadata associated with a data object.

As mentioned above, when implementing a data purging system, care should be taken to ensure that data is purged in an accurate manner. In some cases, purging may be combined with archiving to allow for data recovery. For example, the relevant data items are purged from main storage and archived to secondary storage. However, this may effectively be regarded as a soft purge. A soft purge may be inadequate in some cases, such as in countries where data regulations strictly require a hard purge. Furthermore, a soft purge may provide fewer benefits than a hard purge, such as freeing up only a limited amount of storage space (and thus a more limited cost reduction).

Accordingly, hard purges are often desirable or even required. In some cases, to avoid or reduce the occurrence of irrevocable data loss where hard purges are performed, a manual verification step can be added to require explicit human confirmation prior to the purging of data by a purging engine. This may be useful, for example, where users associated with an enterprise store most of their data in the cloud without local backups. While such a verification step may improve the accuracy of a data purging process and reduce the risk of data loss, it is not feasible for large scale operations, such as recurring back-end purging jobs or relatively large purge jobs. Manual verification may thus fail to provide an adequate solution.

Furthermore, even in cases where a manual verification layer is added, purging processes can be complex and error prone. For example, when purging data across a hybrid or distributed system (e.g., a Hadoop Distributed File System (HDFS)), data may belong to different owners or be spread across different product areas, increasing the risk of errors. Examples of purging errors include incomplete purges and incorrect purges.

The term "incomplete," as used herein in the context of data purging, refers to a data purging process that fails to purge all data items in accordance with a purge policy. For example, the purge policy may specify that all data items created more than three years ago must be deleted, but some data items older than three years may remain after a purge job. An incomplete purge may result from connection issues or other technical issues and can also be described as a "partial purge." The term "incorrect," as used herein in the context of data purging, refers to a data purging process that results in at least one data item being wrongly purged. In other words, a data item is purged even though it is excluded from a scope of the purge job by the relevant criteria or timing. For example, where only data items created more than three years ago must be deleted, a data item that was created two years ago may be incorrectly purged by a purging engine. An incorrect purge may be caused, for example, by bugs or errors in purging logic or by a failure to detect interdependencies between data items.

Examples described herein allow for early or real-time identification of purge defects through a data purge verification mechanism. The data purge verification mechanism may be implemented to detect incorrect or incomplete data purging automatically and, in some examples, initiate an error correction operation in response thereto (e.g., to reverse an erroneous purge or retry an incomplete purge). Examples of the present disclosure may ensure more accurate or complete data purges without a manual verification layer by automatically checking, during the data purging process, whether results of the data purging process align with expected results based on purge policies.

In some examples, a data purging process includes a plurality of subprocesses. A method may include executing a first subprocess of the data purging process to purge a plurality of data items and accessing purge result data indicative of a result of the first subprocess. The data purging process may, for example, be a scheduled purge job.

A data purging system may initiate the data purging process based on a purge policy. The term "purge policy," as used herein, refers to any one or more criteria or rules that govern the purging of data items. For example, a purge policy may specify what data items should be purged, when data is eligible for purging, and how frequently purging should be performed. A purge policy may identify one or more target data sources (e.g., target storage locations). The target data sources may be storage locations or other components in scope for purging, such as databases, file systems, applications, or folders. The purge policy may identify one or more target data sources and at least one retention period (or other purge criteria) for each target data source. The accessing of the purge result data may include accessing the one or more target data sources subsequent to the execution of the first subprocess.

The method may further include determining, based on the purge result data, that the first subprocess was not executed in accordance with a specific purge policy associated with the data purging process. In some examples, if the data purging system determines that the first subprocess was not executed in accordance with the purge policy, the data purging system adjusts a state of the data purging process and executes a second subprocess of the data purging process according to the adjusted state. For example, the data purging system may designate the data purging process as being in an error state and perform an error correction operation as part of the second subprocess.

Determining that the first subprocess was not executed in accordance with the purge policy may include detecting, based on the purge result data, that one or more of the plurality of data items were incorrectly purged. Alternatively or additionally, determining that the first subprocess was not executed in accordance with the purge policy may include detecting, based on the purge result data, an incomplete purge (e.g., by detecting that the plurality of data items constitutes an incomplete set).

The first subprocess may comprise a soft purge of the plurality of data items or a hard purge of the plurality of data items. The soft purge may include marking, in one or more target storage locations associated with the data purging process, the plurality of data items as deleted without permanently removing the plurality of data items.

In some examples, the first subprocess is a soft purge and the second subprocess reverses the soft purge based on the detection of an error with respect to the soft purge. A third subprocess of the data purging process may be disabled prior to execution of the third subprocess. For example, the third subprocess may include a hard purge of the plurality of data items, and the disabling of the third subprocess may prevent the hard purge subsequent to the soft purge (e.g., to avoid making the error "permanent").

In some examples, the first subprocess is a hard purge. The first subprocess may be a hard purge of one of a plurality of batches of data items. In such cases, the plurality of data items may be a first batch of data items, and the second subprocess may include, responsive to detecting an incorrect purge of the first batch, disabling a third subprocess of the data purging process (e.g., a hard purge of a second batch of data items) prior to execution of the third subprocess.

Prior to the execution of the first subprocess, the data purging system may access one or more target data sources identified by the purge policy to generate pre-purge preview data indicative of an expected result of the first subprocess. Subsequent to the execution of the first subprocess, the data purging system may receive or access the purge result data from a processor-implemented purging component that executed the first subprocess and access the one or more target data sources to generate post-purge verification data. In some examples, the pre-purge preview data, the purge result data, and the post-purge verification data are used to determine whether the first subprocess was executed in accordance with the purge policy.

In some examples, in response to detecting that the plurality of data items constitutes an incomplete set (e.g., incomplete purging of data items), the data purging system may identify, based on the purge policy, one or more additional data items missing from the plurality of data items. The data purging system may cause the first subprocess to be retried with respect to the one or more additional (e.g., missed) data items.

As mentioned, a state of the data purging process may be adjusted. For example, the state may be adjusted from a normal purging state in which all identified data items are eventually hard purged by the purging engine without corrective operations, to an adjusted state in which at least one corrective operation is performed. The adjusted state may be the error state referred to above. The error state may trigger one or more error correction operations or other operations that, for example, prevent further hard purging of data items (e.g., to prevent loss or further loss of incorrect data items).

In some examples, the method includes causing transmission of a notification to a user device. The notification may be indicative of the error state. The notification may be presented at the user device via a graphical user interface. The notification may include various data, such as an indication of an error (e.g., incorrect purge or incomplete purge) or information describing data items associated with the error.

The data purging system may provide access to both user devices and administrator devices. An administrator or user may define a purge policy and, for example, schedule recurring purge jobs to remove data among different products.

In some examples, the data purging system is configured to implement a two-step purge mode or a preview validation mode in order to carry out data purge verifications. In the two-step purge mode, the first subprocess referred to above may be a soft purge, while in the preview validation mode, the first subprocess referred to above may be a hard purge. The two-step purge mode may initiate an error correction operation that reverses the soft purge, while the preview validation mode may initiate one or more alternative error correction operations, as described further below.

Examples described herein may address or alleviate technical problems associated with data purging or the verification of data purging outcomes. In some examples, the technical problem of inadvertent permanent deletion of data items during automated purging is addressed by implementing real-time verification. In some cases, the two-step purge mode may prevent such permanent deletion by rolling back a soft purge. In other cases, the preview validation mode may prevent a data purging process that has erroneously hard-purged a batch of data items from hard-purging further batches of data items associated with the same data purging process.

The automated verification techniques described herein may provide a technical solution that improves the overall accuracy of data purging or reduces unwanted data loss that would otherwise be challenging, expensive, or even impossible to restore. In this way, the reliability, robustness, efficiency, or integrity of a data purging system can be improved, particularly across large-scale, cloud-based storage systems.

Examples described herein may thus improve the functioning of a computer system, such as a cloud-based storage system, by improving purging accuracy, reducing the risk of incomplete data purges, or reducing the risk of unwanted data loss. This may allow for computing resources utilized by systems, databases, or networks to be more efficiently utilized.

In some examples, the functioning of a data purging system is improved by providing a verification component (which may also be referred to as a validator) that runs separately from a primary purging job carried out by a purging component. This may provide resilience against propagation of errors. Furthermore, the purging and verification components may process and validate data items in batches to allow for errors to be identified early in the data purging process.

When the effects in this disclosure are considered in aggregate, one or more of the methodologies described herein may obviate a need for certain efforts or resources that otherwise would be involved in purge verification or error correction operations, such as data recovery processes, or expensive or error-prone manual verification procedures. Examples of such computing resources may include processor cycles, network traffic, memory usage, graphics processing unit (GPU) resources, data storage capacity, power consumption, and cooling capacity.

FIG. 1 is a diagrammatic representation of a networked computing environment 100 in which some examples of the present disclosure may be implemented or deployed. One or more servers in a server system 104 provide server-side functionality via a network 102 to a networked device, in the example form of a user device 106 that is accessed by a user 130. The user 130 may, for example, be a customer accessing one or more products or services provided by a service provider via the server system 104. Examples of the products or services are provided below. An administrator 112, such as an administrator associated with the service provider, may also access the server system 104 via the network 102 (e.g., by using an administrator device 114).

A web client 110 (e.g., a browser) or a programmatic client 108 (e.g., an "app") may be hosted and executed on the user device 106. Although not shown in FIG. 1, the administrator device 114 of the administrator 112 may be similar to the user device 106 and also host and execute a similar web client or programmatic client.

An Application Program Interface (API) server 122 and a web server 124 provide respective programmatic and web interfaces to components of the server system 104. A specific application server 120 hosts a data purging system 128 which includes components, modules, or applications. Storage system servers 126 host or provide access to a storage system. For example, the storage system may be a distributed cloud-based storage system, such as a HDFS.

The user device 106 can communicate with the application server 120. For example, communication can occur via the web interface supported by the web server 124 or via the programmatic interface provided by the API server 122. It will be appreciated that, although only a single user device 106 is shown in FIG. 1, a plurality of user devices may be communicatively coupled to the server system 104 in some examples. Further, while certain functions may be described herein as being performed at either the user device 106 or administrator device 114 (e.g., web client 110 or programmatic client 108) or the server system 104, the location of certain functionality either within the user device 106 or administrator device 114, or the server system 104, may be a design choice.

The application server 120 is communicatively coupled to the storage system servers 126, facilitating access to one or more information storage repository, such as storage 136 or storage 138. The storage 136 or storage 138 may, for example, include one or more databases or file systems. In some examples, the storage system servers 126 provide access to storage devices that store data items to be purged by the data purging system 128 (e.g., files, records, or logs). In some examples, the storage system servers 126 may also be accessed by the user 130 using the user device 106 (e.g., to add new files or modify files), or by the administrator 112 using the administrator device 114. The storage system servers 126 may be accessed directly, or via the API server 122 or web server 124, depending on the implementation.

The application server 120 accesses application data (e.g., application data stored by the storage system servers 126) to provide one or more applications or software tools to the user device 106 or the administrator device 114 (e.g., via a web interface 132 or an app interface 134). As described further below according to examples and with specific reference to FIGS. 2-9, the application server 120, using the data purging system 128, may provide one or more tools or functions for performing data purges and verifying the accuracy of such data purges.

In some examples, the server system 104 is part of a cloud-based platform provided by a software provider that allows the user 130 to utilize features of one or more of the storage system servers 126 and the data purging system 128. The user 130 may utilize one or more software offerings of the software provider, such as a data storage solution, an accounting solution, a human resources module, a planning module, or an enterprise resource planning solution. For each offering, the server system 104 may cause data items to be stored in the storage 136 or storage 138.

For example, the user 130 may store data items via the storage system servers 126 and make use of the data purging system 128 to perform purges according to one or more purge policies (e.g., to ensure compliance with data retention regulations). Different purge policies may be applied to different offerings or modules, or even within the same offering or module. In some examples, the user 130 can transmit a data purge request to initiate or cause scheduling of a data purge. The user 130 may upload one or more purge policies to the data purging system 128 via the user device 106. The data purging system 128 then uses each purge policy to schedule purge jobs.

In some examples, the data purging system 128 is a centralized system configured to execute automated data purging operations on one or more storage systems associated with an enterprise based on defined purge policies. The data purging system 128 provides a platform to apply retention rules for deleting obsolete, redundant, or unnecessary data. The data purging system 128 may also delete specific or custom data items on request.

The data purging system 128 may also provide one or more dashboards via a graphical user interface on the user device 106 or the administrator device 114, such as a dashboard that allows the user 130 or administrator 112 to track, monitor, or manage data purges. Notifications of errors detected in data purging processes may be transmitted or presented at the user device 106 or the administrator device 114 via the graphical user interface.

As mentioned, the storage system servers 126 may provide access to a distributed storage system that is accessed by the data purging system 128 to purge data. Purging may be performed to free up storage space or reduce costs, and may be driven by user instructions, purge policies, or regulatory compliance (e.g., a law requiring data to be completely removed from a system after a certain period). In some examples, the distributed storage system comprises an HDFS or other distributed file system (DFS). A DFS is a file system that enables clients to access file storage from multiple hosts through a computer network. Files may be spread across multiple storage servers in multiple locations. In some examples, a DFS can be designed so that geographically distributed users, such as remote workers and distributed teams, can access and share files remotely as if they were stored locally.

A DFS may cluster together multiple storage nodes that each have their own computing power and storage and distribute data sets across multiple nodes. In some examples, data items are replicated onto multiple servers, which enables redundancy to keep data highly available. The data on a DFS can reside on various types of storage devices, such as solid-state drives and hard disk drives, and examples described herein are not restricted to a particular type of storage device.

One or more of the application server 120, the data purging system 128, the storage system servers 126, the API server 122, the web server 124, or parts thereof, may each be implemented in a computer system, in whole or in part, as described below with respect to FIG. 12. In some examples, external applications, such as an external application 118 executing on an external server 116, can communicate with the server system 104 via the programmatic interface provided by the API server 122. For example, a third-party application may support one or more features or functions on a website or platform hosted by a third party, or may perform certain methodologies and provide input or output information to the server system 104 for further processing or publication. The external application 118 may, for example, access the storage system servers 126 to view or modify files, or access the data purging system 128 to view the status of data purge jobs.

The network 102 may be any network that enables communication between or among machines, databases, and devices. Accordingly, the network 102 may be a wired network, a wireless network (e.g., a mobile or cellular network), or any suitable combination thereof. The network 102 may include one or more portions that constitute a private network, a public network (e.g., the Internet), or any suitable combination thereof.

One or more of the components in FIG. 1 may be implemented using hardware (e.g., one or more processors of one or more machines) or a combination of hardware and software. For example, a component may be implemented by a processor configured to perform the operations described herein for that component. Moreover, two or more of these components may be combined into a single component, or the functions described herein for a single component may be subdivided among multiple components. Furthermore, according to various examples, components described herein may be implemented using a single machine, database, or device, or be distributed across multiple machines, databases, or devices.

Figure 2:
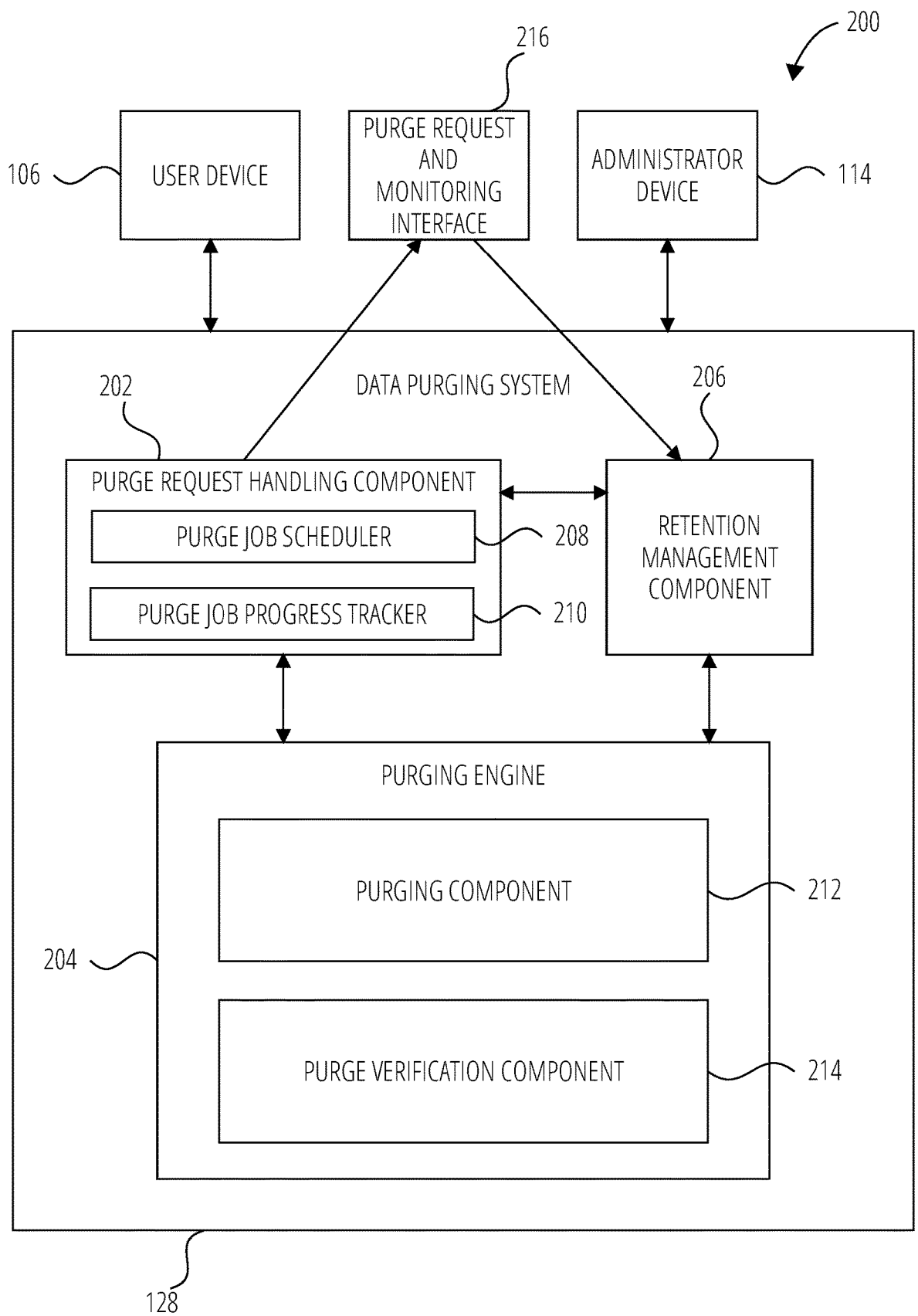
FIG. 2 is a diagrammatic representation of a data purging system, according to some examples.

FIG. 2 is a diagram 200 that illustrates the data purging system 128 of FIG. 1, according to some examples. FIG. 2 also shows the user device 106 and the administrator device 114 of FIG. 1, that are communicatively coupled with the data purging system 128.

The data purging system 128 is shown to include a purge request handling component 202, a purging engine 204, and a retention management component 206. The purge request handling component 202 may provide an interface for users or administrators to submit purge requests (e.g., by uploading purge policies) and handle the scheduling of purge jobs. An example of such an interface is shown as a purge request and monitoring interface 216 in FIG. 2. The purge request and monitoring interface 216 can be accessed by the user device 106 or the administrator device 114.

The purge request handling component 202 may include a purge job scheduler 208 and a purge job progress tracker 210. The purge job scheduler 208 functions as a scheduling component of the data purging system 128. The purge job scheduler 208 may be configured to receive requests and establish schedules for automated purge jobs (e.g., recurring data purging processes) to be invoked in line with defined frequencies, such as daily, weekly, or monthly. The purge job scheduler 208 may trigger the purging engine 204 at the appropriate times to act on deleting data based on the relevant purge policies. The purge job progress tracker 210 functions as a monitoring component of the data purging system 128. The purge job progress tracker 210 may be configured to track the status and progress of data purging processes (e.g., scheduled purge jobs) as they execute. The purge job progress tracker 210 may provide visibility into ongoing and historical purge operations across various storage systems (e.g., via the purge request and monitoring interface 216).

The purging engine 204 is a processor-implemented component that executes data purges, verifies whether purges were performed correctly or completely, and initiates corrective measures where needed. The purging engine 204 determines the appropriate purging logic to apply based on the relevant purge policy and other factors, such as the capabilities or limitations of the target data source. The purging engine 204 may leverage bulk operations for efficiency in deleting large volumes of data.

In use, the purging engine 204 may connect to a storage system, such as a DFS, and delete or overwrite the specific data being requested for purge by the purge request handling component 202. The nature of purging operations may depend on the implementation and can include operations such as deleting files, overwriting file blocks, and updating metadata. As mentioned, in examples described herein, purging operations may include hard purges, soft purges, or combinations thereof. The purging engine 204 may access data purge requests from the purge request handling component 202 and process the data purge requests (e.g., in batches). For each request, the purging engine 204 may locate the relevant files or blocks to purge based on criteria, such as timestamps, file paths, or data identifiers, and then execute the purging operation.

The purging engine 204 may notify the purge request handling component 202 that a data purge request was successfully processed. In some examples, if a purge operation (or part thereof) fails, the purging engine 204 may notify the purge request handling component 202 of the failure. For example, the purging engine 204 may notify the purge request handling component 202 of an error, such as an incorrect or incomplete purge, together with an indication of the data items impacted by the error. The purge request handling component 202 may then transmit a notification of the error to the user device 106 or the administrator device 114 (e.g., via the purge request and monitoring interface 216).

In FIG. 2, the purging engine 204 is shown to include a purging component 212 that is responsible for the purging of data items (e.g., soft purges and hard purges) and a purge verification component 214 that is responsible for verifying the accuracy of such purging. The purge verification component 214 may also be configured to trigger error correction operations in response to detecting errors. In some examples, the purge verification component 214 functions as an audit component or "validator" configured to verify the results of purge jobs by comparing expected purge results against actual results, such as query results of the storage systems after deletion. The purge verification component 214 may then identify and initiate corrective actions or halt a purging operation in real-time in response to detecting a discrepancy.

The purge verification component 214 may verify purges based on one of two modes of the purging engine 204: a two-step purge mode and a preview validation mode. Both modes may enable purge policy validation substantially in real-time.

The two-step purge mode may include a multi-phase purging process in which data items are soft purged by the purging component 212 prior to any hard purging. This allows for verification of the soft purge by the purge verification component 214 prior to the purging component 212 performing the (irreversible) hard purge. The two-step purge mode may, for example, be useful for products (e.g., specific types of storage) that have the capacity to mark content as deleted or stale.

The preview validation mode may include a multi-phase purging process in which the purge verification component 214 generates pre-purge preview data prior to hard purging of data by the purging component 212. After hard purging has been completed by the purging component 212, purge result data may then be compared to the pre-purge preview data by the purge verification component 214 to verify the accuracy of the hard purge.

Turning now to the retention management component 206, the retention management component 206 functions as a policy management component of the data purging system 128. For example, the retention management component 206 may contain purge policies or other rules or settings governing the purging of data items. For example, the retention management component 206 may regulate how data attributes, such as file type, age, modification information, and other metadata, are evaluated against purge policies to determine purge eligibility. The retention management component 206 may communicate with the purge request handling component 202 to schedule purge jobs at the appropriate times, and with the purging engine 204 to ensure that purging rules and criteria are applied. In some examples, the retention management component 206 may specify whether the purging engine 204 executes purges for identified data sources in the two-step purge mode or the preview validation mode.

As mentioned, the user device 106 or the administrator device 114 may be enabled to access the purge request and monitoring interface 216. For example, the user device 106 may access the purge request and monitoring interface 216 via the web interface 132 or the app interface 134 of FIG. 1. The purge request and monitoring interface 216 may allow the user 130 to submit or change instructions (e.g., create or adjust purge policies) that are then provided to the retention management component 206 or the purge job scheduler 208. The purge request and monitoring interface 216 may further aggregate information from the purge job progress tracker 210 to provide the user 130 with a dashboard indicating the status of various data purging processes.

The architecture as shown in FIG. 2 may integrate easily with existing purging engines and storage systems. In some examples, at least some of the components shown in FIG. 2 are configured to communicate with each other to implement aspects described herein. One or more of the components described herein may be implemented using hardware (e.g., one or more processors of one or more machines) or a combination of hardware and software. For example, a component described herein may be implemented by a processor configured to perform the operations described herein for that component. Moreover, two or more of these components may be combined into a single component, or the functions described herein for a single component may be subdivided among multiple components. Furthermore, according to various examples, components described herein may be implemented using a single machine, database, or device, or be distributed across multiple machines, databases, or devices.

As mentioned, a purge policy may include one or more criteria or rules that govern the purging of data items. A data retention policy is an example of a purge policy. A data retention policy may define how long data should be retained before it is removed from a system or device. Further, the data retention policy may define how to dispose of such data.

Figure 3:
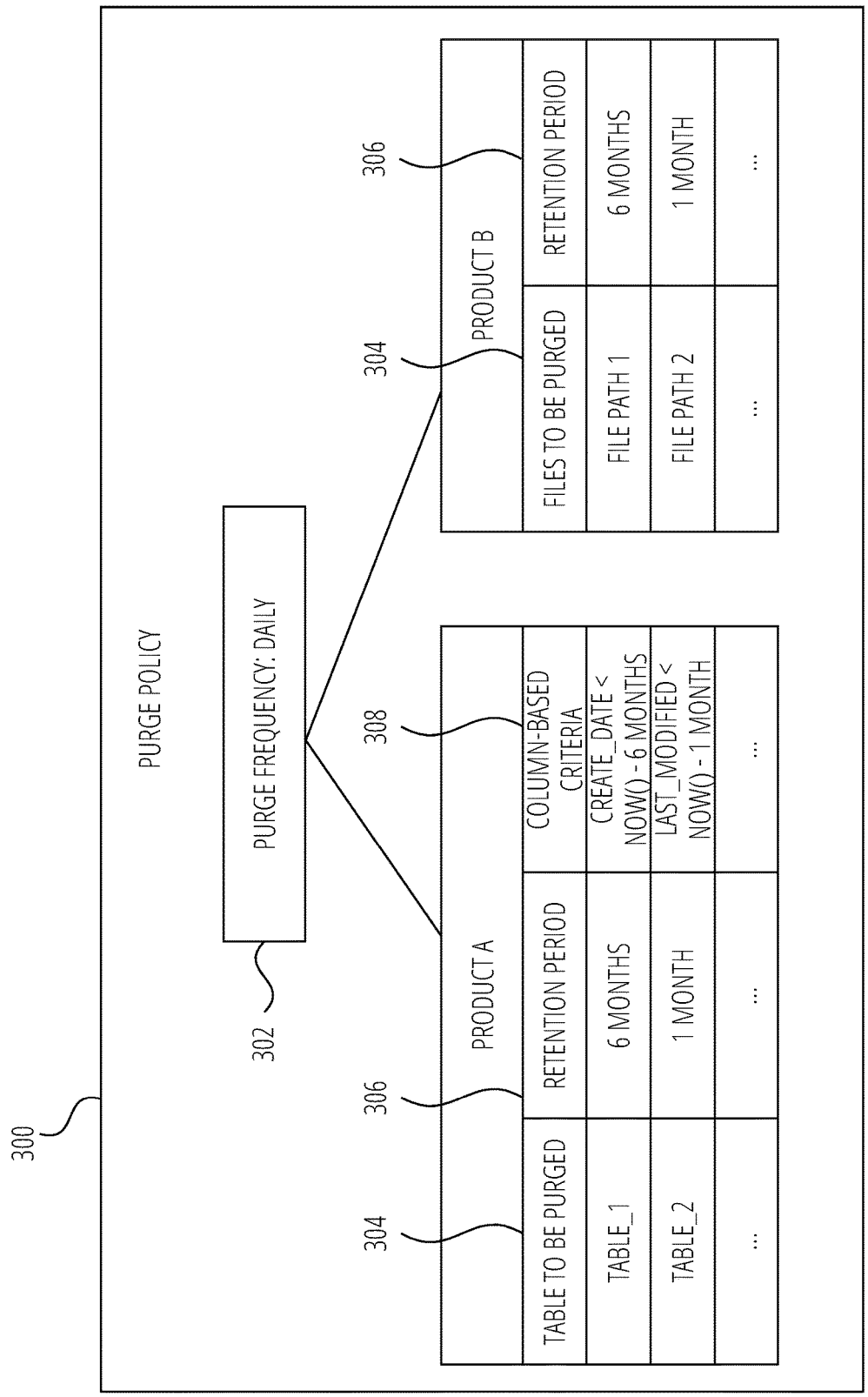
FIG. 3 is a diagrammatic representation of a purge policy, according to some examples.

FIG. 3 is a diagrammatic representation of a purge policy 300, according to some examples. The purge policy 300 of FIG. 3 is a data retention policy that covers two different products: "Product A" and "Product B." In this case, "Product A" refers to a data storage solution that provides database storage, and "Product B" refers to a file system solution. For example, the user 130 of FIG. 1 may store records in data tables using "Product A" and may utilize the file system of "Product B" in its business operations (e.g., via the server system 104).

The purge policy 300 specifies a purge frequency 302. In this example, the data items covered by the purge policy 300 are purged on a daily basis. For example, the purge job scheduler 208 of FIG. 2 may schedule a daily recurring data purging process associated with the purge policy 300. For each product, the purge policy 300 identifies target data sources (e.g., target storage locations) that include data items to be purged and purge criteria to be applied to determine whether data items are eligible for purging.

For example, referring to "Product A," FIG. 3 shows two example target storage locations 304 in the form of tables. Each table has a retention period 306 that is applied by implementing specific purge criteria 308. For example, the table identified as "Table_2" should be purged on a daily basis, and the data items to be purged are those that were last modified more than one month ago, as per the purge criteria 308. Referring to "Product B," FIG. 3 shows two example target storage locations 304 in the form of file paths. The files identified by each file path have a retention period 306. For example, for "File Path 1," files identified by this file path should be purged on a daily basis, but only those files that are more than 6 months old.

It will be appreciated that the purge policy 300 of FIG. 3 is provided as a non-limiting example, and that various other purge policies may be utilized in other examples. A purge policy may generally define one or more of target data sources that are in scope for purging (e.g., databases, storage systems, or applications) purge criteria, purge schedules or time intervals, permanent deletion requirements (e.g., should data be hard purged or soft purged), legal retention periods to comply with regulations, whether approval is needed before purging certain data items, backup or archival requirements associated with the data items, as well as logging or reporting rules for purge operations. In some examples, a purge policy may specify whether the purging engine 204 executes purges for identified data sources in the two-step purge mode or the preview validation mode.

Figure 4:
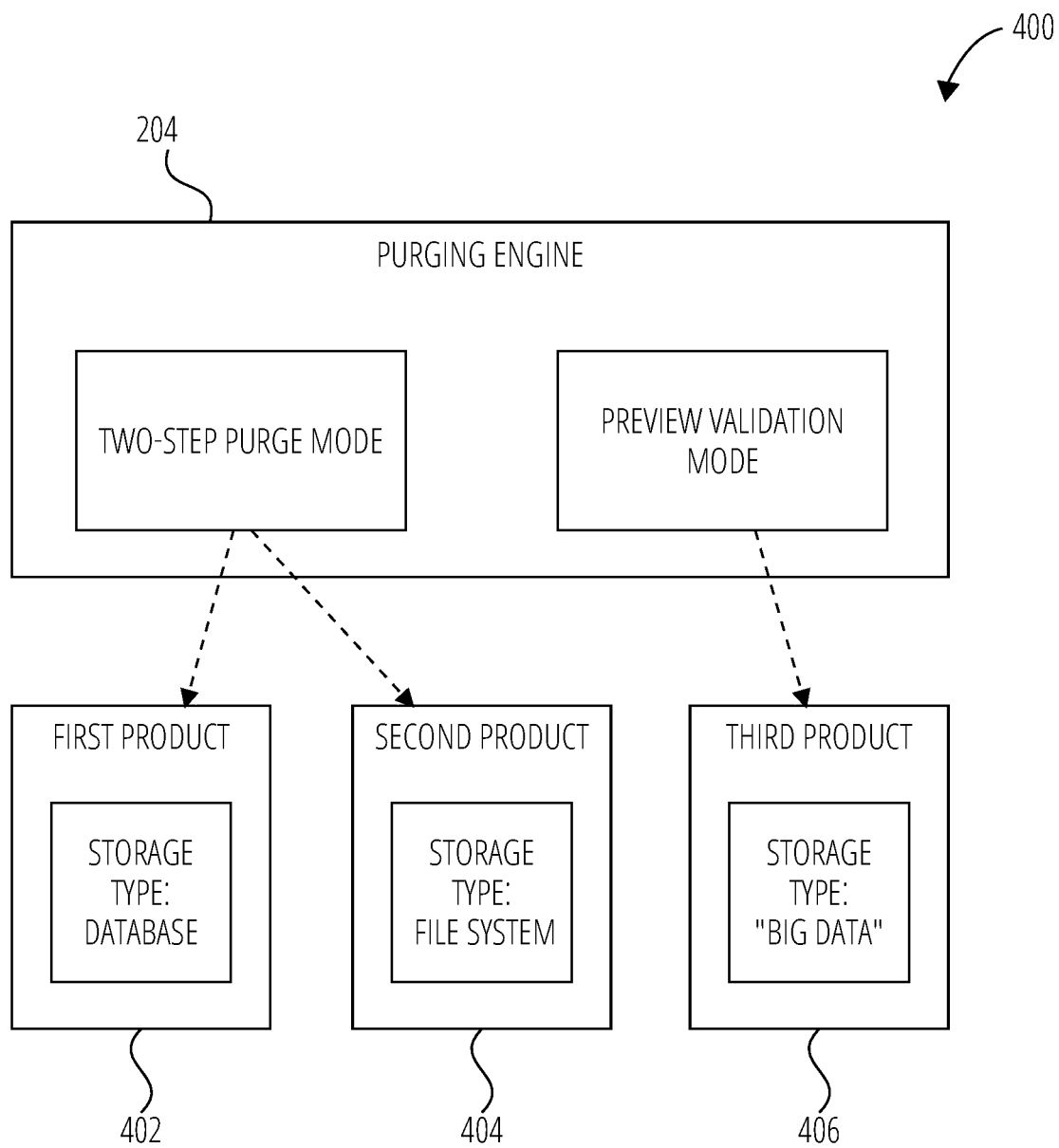
FIG. 4 is a diagrammatic representation of different modes of a purging engine as applied to various types of storage, according to some examples.

FIG. 4 is a diagram 400 that illustrates how the two-step purge mode and the preview validation mode of the purging engine 204 of FIG. 2 may be applied to different products (e.g., products or offerings of an entity managing the server system 104 of FIG. 1). In FIG. 4, a first product 402 provides a user with database storage (e.g., relational database storage), a second product 404 provides a user with file system-based storage (e.g., a HDFS), and a third product 406 is a general category for "big data," as described below.

As mentioned, the two-step purge mode may operate by first performing a soft purge (e.g., performed by the purging component 212). Then, an automatic verification step (e.g., performed by the purge verification component 214) checks if the soft purge was executed properly, as per the relevant purge policy. If errors are detected, the two-step purge mode allows for "rolling back" of those errors prior to hard purging.

In some examples, the two-step purge mode may be used for products that allow for accurate or verifiable soft purges. For example, and as shown in FIG. 4, the two-step purge mode may be applied to records stored in tables using the first product 402, as the records can be marked as "deleted" to effect a soft purge (without permanently deleting them).

Further, and as shown in FIG. 4, the two-step purge mode may also be applied to the second product 404 as the file system may allow for a "recycle bin" type mechanism in which files are deleted in a recoverable manner. In some examples, data items that have been soft purged are not visible to end users.

The two-step purge mode may enhance system robustness by reducing downtime and human intervention needed for error recovery. For example, soft purge rollbacks may eliminate unnecessary permanent deletion resulting from flawed purges.

In some cases, the preview validation mode may be applied to products that do not allow for soft purging or are not well suited to soft purging operations. The preview validation mode may operate by generating a preview of data to be purged (e.g., by the purge verification component 214), and then validating a purge (e.g., after a hard purge by the purging component 212) to determine whether a result of the purging matches expectations. This allows for verification of purging without relying on soft purging.

For example, the third product 406 may be a "big data" product that handles large, complex data sets that require specialized analysis techniques. The data handled by the third product 406 may be structured, semi-structured, or unstructured, or may contain combinations thereof. For example, the data items in this category may include clickstream logs, social media posts, sensor readings, or web server logs. The data may be characterized by high volume, velocity, and variety, and may not be well suited to soft purging (e.g., due to file types, distributed architectures, different APIs, and combinations of structured, semi-structured, and unstructured data). Accordingly, the purging engine 204 may implement the preview validation mode to such types of data items.

Preview validations may be performed on batches of data items to ensure that errors can be detected on a batch-by-batch basis. For example, the data purging system 128 of FIG. 1 may identify a purge issue after checking a batch, and then ensure that purging is halted for subsequent batches (or that the error is not propagated into the subsequent batches). This may increase overall resilience to data purge failures, minimize irrecoverable data loss events, reduce manual oversight needed, or streamline operations.

In some examples, the purging engine 204 is configured to selectively adjust the mode such that the two-step purge mode or the preview validation mode can be selected for a given data purging process. For example, the purging engine 204 may adaptively decide on the most appropriate mode based on the purge policy, type of data item, or type of storage associated with a data purging process.

Figure 5:
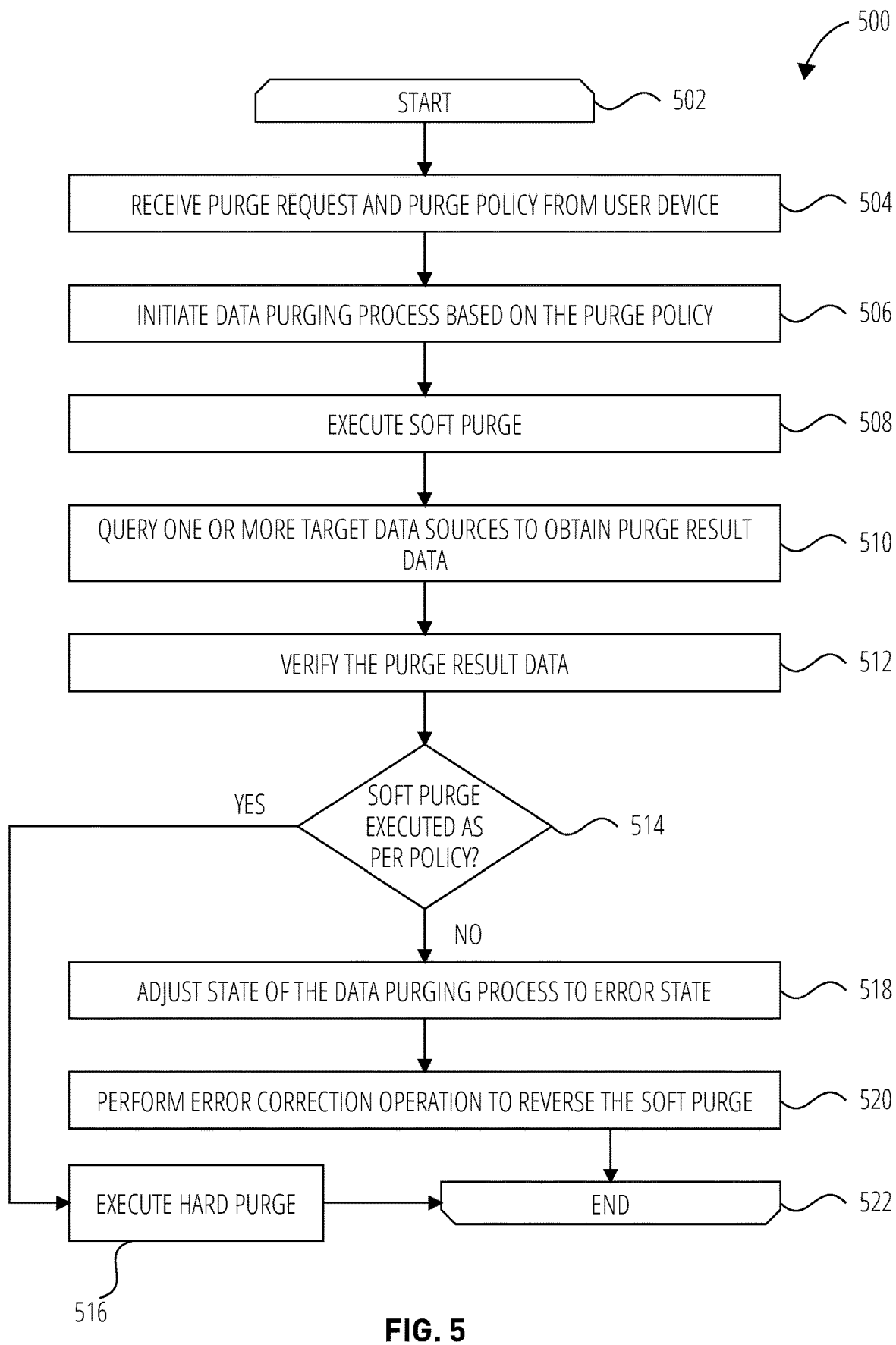
FIG. 5 is a flowchart illustrating operations of a method suitable for performing data purge verification and error correction, according to some examples.

FIG. 5 is a flowchart illustrating operations of a method 500 suitable for performing data purge verification and error correction, according to some examples. Aspects of the method 500 may be performed by components, devices, systems, data structures, interfaces, or entities shown in FIGS. 1 to 4. Accordingly, by way of example and not limitation, the method 500 is described with reference to certain elements of FIGS. 1 to 4. Further, reference is made to elements shown in FIGS. 6 to 8 to illustrate certain examples in a non-limiting fashion. While some operations are described as being performed with respect to a plurality of data items, it shall be appreciated that similar operations may be performed with respect to individual data items.

Figure 6:
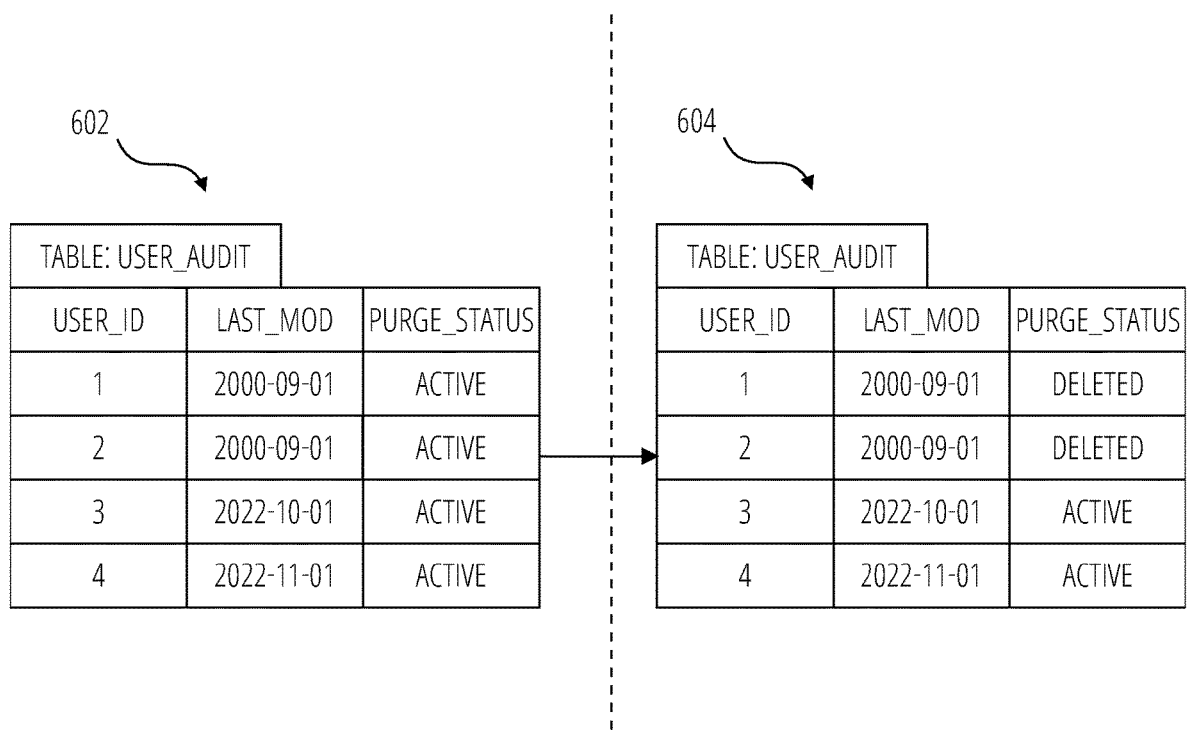
FIG. 6 illustrates a soft purge that is performed with respect to a data table, according to some examples.

The method 500 commences at opening loop element 502 and proceeds to operation 504, where a data purging system (e.g., the data purging system 128 of FIG. 1 and FIG. 2) receives a purge request and a purge policy from a user device (e.g., the user device 106 of FIG. 1). For example, the user 130 may use the user device 106 to upload a new purge policy relating to tables storing data items in the form of records (e.g., using the first product 402 of FIG. 4). An example of such a table 602 is illustrated in FIG. 6.

In the method 500 of FIG. 5, the purging engine 204 operates in the two-step purge mode. For example, the purge policy may indicate that the two-step purge mode is to be utilized for the data items covered by the purge policy. Alternatively, the retention management component 206 or the purging engine 204 may detect, based on the purge policy or a system setting, that the two-step purge mode is to be utilized. For example, the retention management component 206 or the purging engine 204 may identify that data items covered by the purge policy are capable of being soft purged, and designate the two-step purge mode as the active mode.

At operation 506, the data purging system 128 initiates a data purging process based on the purge policy. For example, the purging engine 204 may initiate a data purging process (e.g., a purge job) based on an instruction from the purge request handling component 202. The purge job scheduler 208 of the purge request handling component 202 may schedule the data purging process as required in terms of the purge policy.

The method 500 proceeds to operation 508, where a first subprocess of the data purging process is executed. Given that the two-step purge mode is active, the first subprocess involves a soft purge. The soft purge is performed by the purging component 212 of the purging engine 204, which is responsible for executing the main purging job in the context of the data purging system 128. The purging component 212 accesses each target data source identified by the purge policy and soft purges data items that meet the relevant purge criteria.

For example, and referring again to FIG. 6, in the table 602, each record has a value for the column "Purge_Status." This value indicates whether the record is active or deleted. The record can be marked as deleted to indicate the soft purge, as shown in the updated table 604 in FIG. 6. The updated table 604 therefore shows a result of the soft purge. Specifically, in the updated table 604, the first two records are marked as "deleted" based on a retention rule specifying that all data items with "Last_Mod" (last date modified) values older than 3 years should be deleted.

Referring again to FIG. 5, at operation 510, and prior to hard purging of data items, the purge verification component 214 accesses each target data source identified by the purge policy to obtain purge result data. For example, the purge verification component 214 accesses the updated table 604 of FIG. 6. The purge verification component 214 then checks whether the purge result data accords with the purge policy (operation 512). For example, the purge verification component 214 may check each record in the updated table 604 to determine whether its "Purge_Status" column aligns with what is expected based on the rules in the purge policy. Accordingly, the purge verification component 214 runs independently from the purging component 212 to check whether the purging component 212 applied the correct logic (or made some other error, or performed operations in an incomplete manner) when soft purging the records in the table 602.

Example logic that may be applied by the purge verification component 214 is set out below:

Step 1: Determine cut_off_date. This is derived from the defined retention period for each data item covered by the purge policy. For example, if the retention period is 3 years, then cut_off_date=now( )−3 years.

Step 2: Check whether there are any records in the table user_audit that are wrongly marked as "deleted." This can be detected by checking the last_modified_time versus the cut_off_date. The SQL query below may be used to check the table for records that were incorrectly soft purged. Specifically, the SQL query stores a count of such incorrectly soft purged records in the variable incorrect_soft_purged_cnt, and the assert statement checks whether the variable is less than or equal to one. If the assert fails, it indicates that the soft purge was performed incorrectly.

```
select count(*) as incorrect_soft_purged_cnt from
user_audit where purged_status = 'deleted' and
last_modified_time >= ${cut_off_date}
assert(incorrect_soft_purged_cnt <= 0 )
```

Step 3: Check whether all records before the cut_off_date are marked as "deleted." In other words, check to make sure the soft purge was not an incomplete purge. The SQL query below checks for any records that should have been soft purged, but were missed. Any records that are not marked as "deleted," but that should be marked as such according to the purge policy, are detected and the count of those records are stored in the variable missed_soft_purged_cnt. The assert statement checks that there are no records that should have been soft purged. If the assert fails, it indicates that the soft purge was performed incompletely in that records older than the "cut-off date" were missed.

```
select count(*) as missed_soft_purged_cnt from user_audit
where purged status != 'deleted' and last_modified_time <
${cut_off_date}
assert(missed_soft_purged_cnt <= 0 )
```

Figure 7:
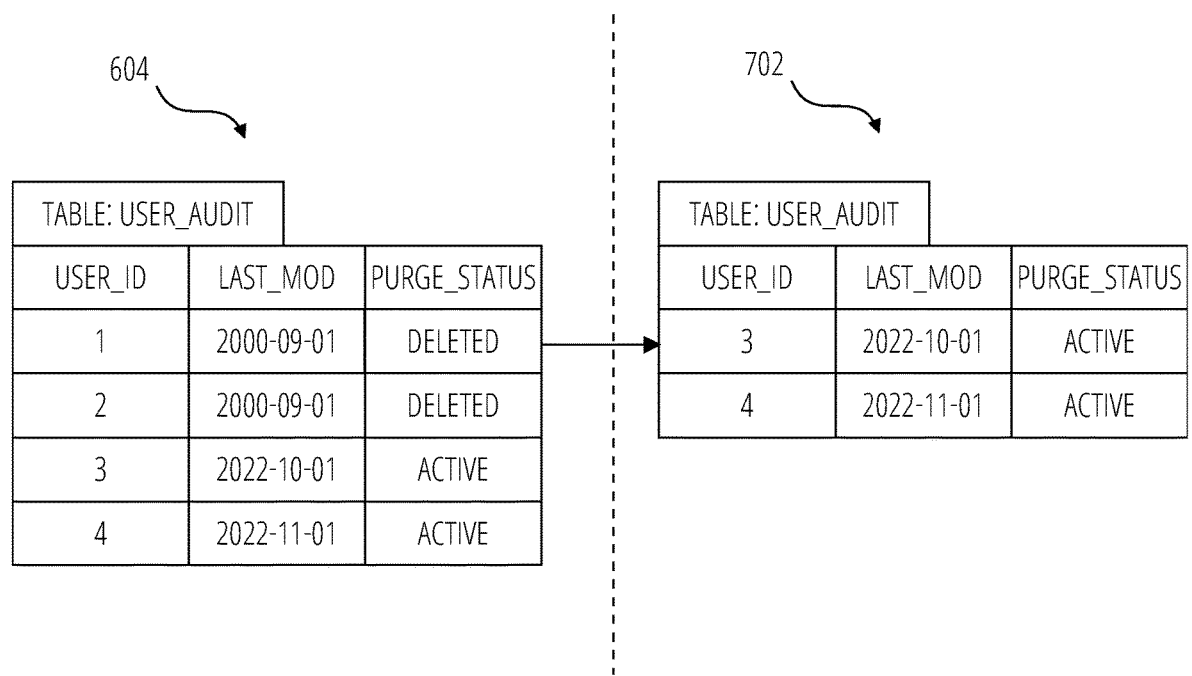
FIG. 7 illustrates a hard purge that is performed with respect to the data table of FIG. 6 subsequent to the soft purge, according to some examples.

If the purge verification component 214 determines, at decision operation 514, that the soft purge was performed fully according to the purge policy, the purge verification component 214 instructs the purging component 212 to proceed with the data purging process in the normal way. The purging component 212 then, at operation 516, hard purges all records that were marked as "deleted" in operation 508, as shown in FIG. 7. Specifically, an updated table 702 in FIG. 7 shows an end result after execution of both the soft purge and the hard purge. Accordingly, in such cases, a first subprocess of the data purging process involves a soft purge, and a second subprocess of the data purging process involves a hard purge. The relevant data items are permanently deleted by the hard purge.

On the other hand, if the purge verification component 214 determines, at decision operation 514 of FIG. 5, that the soft purge was not performed fully according to the purge policy, the purge verification component 214 adjusts a state of the data purging process to an error state (operation 518). For example, if the purge policy actually specified that only records that were last modified more than 30 years ago (and not 3 years ago) are to be deleted, the purge verification component 214 may detect that the purging component 212 erred in marking the first two records in the table 602 as "deleted." The purge verification component 214 may thus designate a state of the data purging process as being the error state.

Figure 8:
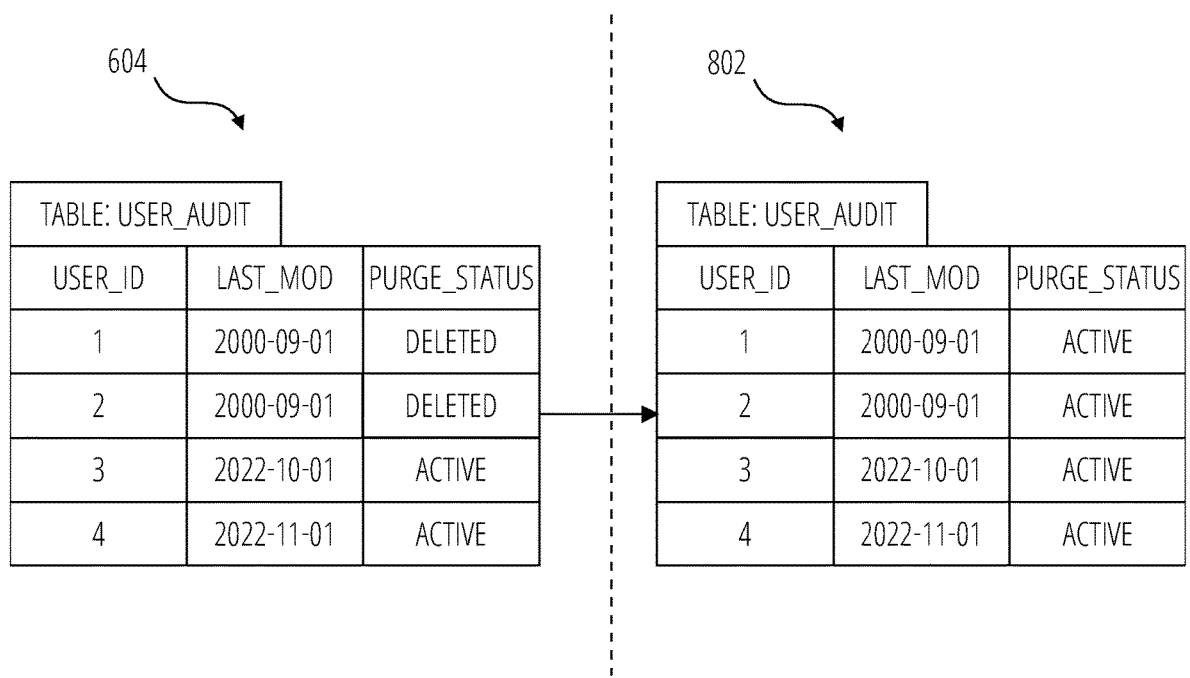
FIG. 8 illustrates a reversal of the soft purge that is performed with respect to the data table of FIG. 6, according to some examples.

The method 500 then proceeds to operation 520, where the purge verification component 214 or the purging component 212 (depending on the implementation) performs an error correction operation to reverse the soft purge. The error correction operation may be triggered in response to the error state. For example, the purge verification component 214 may instruct the purging component 212 to reverse the soft purge in response to detecting the deviation from the purge policy. As illustrated in FIG. 8, the reversal of the soft purge may result in a restored table 802 that is identical to the initial table 602 of FIG. 6. This allows changes to be reversed to avoid any missing or incomplete data. When the error state is entered, the first subprocess of the data purging process includes a soft purge, and a second subprocess includes a reversal of the soft purge.

In some examples, where the purge verification component 214 detects an incomplete purge at decision operation 514, instead of or in addition to reversing the soft purge, the purge verification component 214 may instruct the purging component 212 to supplement the initial soft purge with a further soft purge (e.g., as operation 520) to ensure that all the necessary data items are covered by the soft purge. A hard purge may then be executed to finalize purging. Accordingly, in some examples, the method 500 allows for automatic retries with respect to incomplete soft purges.

In some examples, the data purging system 128 may execute separate "purge" and "validator" threads to ensure that the accuracy of the data purging process is checked in real-time. The "validator" thread may be executed by the purge verification component 214 separately from the "purge" thread, or main purging job, which is executed by the purging component 212. This separation ensures that the verification process is not affected by the main purging process, allowing the purge verification component 214 to pick up errors made by the purging component 212 in an independent manner or providing resilience against error propagation. The method 500 concludes at closing loop element 522.

Figure 9:
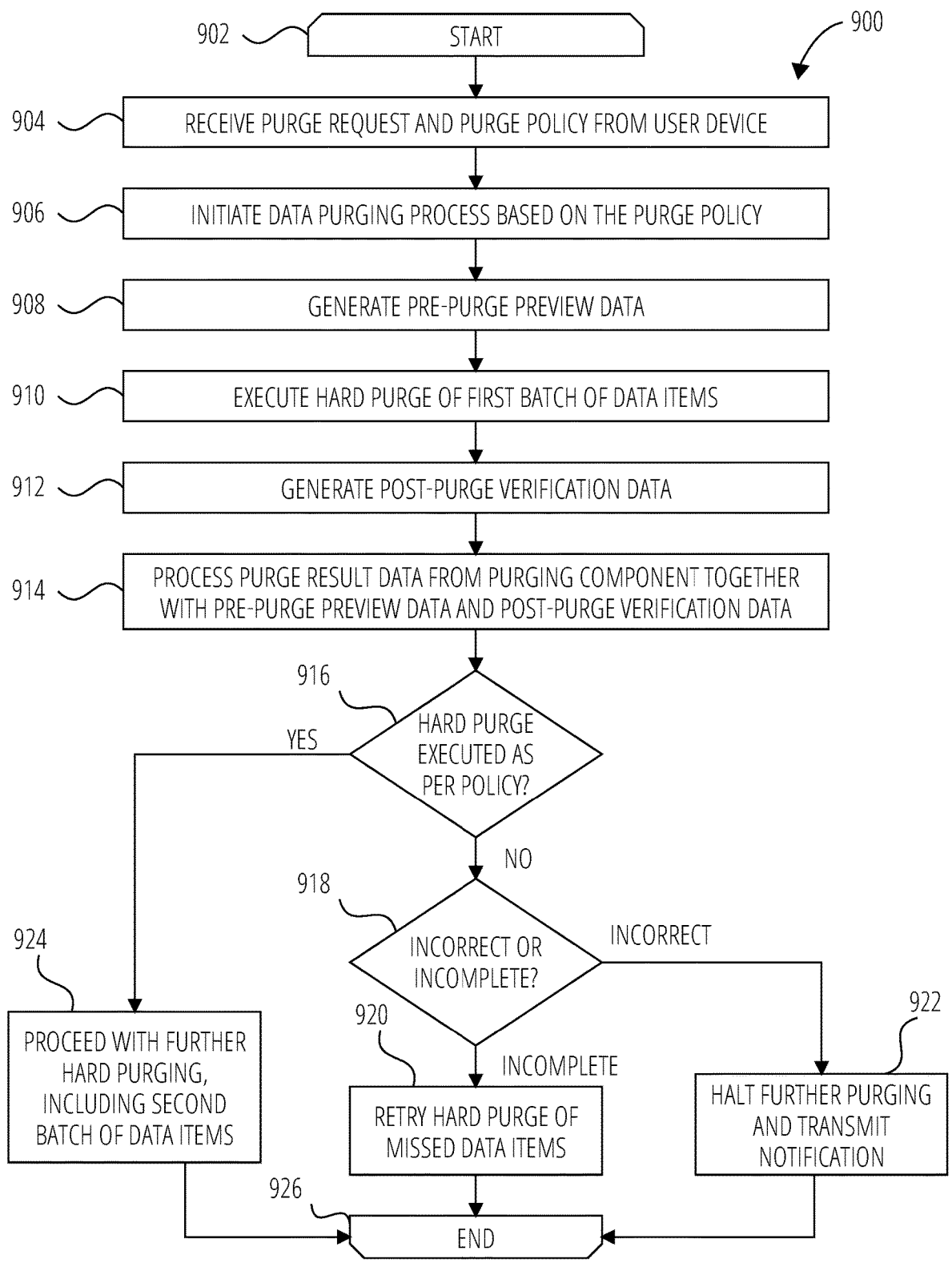
FIG. 9 is a flowchart illustrating operations of a method suitable for performing data purge verification and error correction, according to some examples.

FIG. 9 is a flowchart illustrating operations of a method 900 suitable for performing data purge verification and error correction, according to some examples. Aspects of the method 900 may be performed by components, devices, systems, data structures, interfaces, or entities shown in FIGS. 1 to 4. Accordingly, by way of example and not limitation, the method 900 is described with reference to certain elements of FIGS. 1 to 4. Further, while some operations are described as being performed with respect to a plurality of data items, it shall be appreciated that similar operations may be performed with respect to individual data items.

The method 900 commences at opening loop element 902 and proceeds to operation 904, where a data purging system (e.g., the data purging system 128 of FIG. 1 and FIG. 2) receives a purge request and a purge policy from a user device (e.g., the user device 106 of FIG. 1). For example, the user 130 may use the user device 106 to upload a new purge policy relating to data items collected and stored in a "big data" storage (e.g., using the third product 406 of FIG. 4).

In the method 900 of FIG. 9, the purging engine 204 operates in the preview validation mode. For example, the purge policy may indicate that the preview validation mode is to be utilized for the data items covered by the purge policy. Alternatively, the retention management component 206 or the purging engine 204 may detect, based on the purge policy or a system setting, that the preview validation mode is to be utilized. For example, the retention management component 206 or the purging engine 204 may identify that data items covered by the purge policy are not capable of being soft purged, and designate the preview validation mode as the active mode.

At operation 906, the data purging system 128 initiates a data purging process based on the purge policy. For example, the purging engine 204 may initiate a data purging process (e.g., a purge job) based on an instruction from the purge request handling component 202. The purge job scheduler 208 of the purge request handling component 202 may schedule the data purging process as required in terms of the purge policy.

In the method 900, the purging engine 204 divides the data to be purged into batches of data items and processes them batch-by-batch. As is described elsewhere, purging and validating on a batch-by-batch basis may reduce the risk of data loss or error propagation. However, it will be appreciated that techniques described herein are not limited to batch-wise processing and validation, and may be applied to data items that are not purged in a batch-by-batch manner.

Still referring to FIG. 9, the method 900 proceeds to operation 908, where the purge verification component 214 generates pre-purge preview data. The pre-purge preview data may be generated for a first batch expected to be purged, or for all data items expected to be purged, as indicated above.

For example, a "validator" thread may be launched by the purge verification component 214 to analyze the input parameters of a purge request (e.g., the purge policy rules or criteria) and perform preliminary queries on the identified target data sources to generate the pre-purge preview data. The pre-purge preview data may be indicative of an expected result of the data purging process. Metrics or queries used by the purge verification component 214 to generate the pre-purge preview data may depend on the implementation. For example, the purge verification component 214 may query storage to obtain details of the data items expected to be removed from storage (e.g., the number of items or identifiers of items) or an indication of storage space that will be freed up by the upcoming purge event.

Performing one or more preview queries thus allows the purge verification component 214 to understand the expected scope and impact of the impending purge. This pre-purge preview phase allows the data purging system 128 to gain visibility into the data and storage that will be affected prior to executing a hard purge. The resulting pre-purge preview data may be stored by the data purging system 128 for comparison after the hard purge occurs to verify correct execution, as is described below.

The method 900 proceeds to operation 910, where a main purging job is executed. Given that the preview validation mode is active, a hard purge is performed by the purging component 212 at operation 910 (the hard purge is not preceded by a soft purge). In the method 900 of FIG. 9, the hard purge is performed with respect to the first batch of data items referred to above.

Once the hard purge of operation 910 has been completed by the purging component 212, the purge verification component 214 generates post-purge verification data at operation 912. The post-purge verification data is generated to allow the purge verification component 214 to compare the expected result, as indicated by the pre-purge preview data, with an actual outcome of the hard purge.

In some examples, the purge verification component 214 obtains purge result data from the purging component 212. The purge result data obtained from the purging component 212 includes the details of the data items that were actually hard purged, as reported by the purging component 212. The purge verification component 214 then performs further querying of the identified target data sources in order to obtain the post-purge verification data. For example, the post-purge verification data may relate to the first batch.

In some examples, the pre-purge preview data can be regarded as a "Preview Result," the actual purge result data returned by the purging component 212 can be regarded as a "Purge Result," and the post-purge verification data obtained by querying the target data sources again after the hard purge can be regarded as a "New Query Result." At operation 914, the purge verification component 214 then processes all three sets of data in a verification step. An example of verification step logic is provided below:

Preview Result is generated by taking the pre-purge preview data identifying the expected scope of the purge. It acts as the baseline for what should be purged.

PurgeResult is generated by taking data on what was actually purged returned by the purging component 212.

newQueryResult is generated by taking post-purge query data of the target storage to identify what remains after the purge.

These three data sets are compared to validate that the hard purge was executed correctly and completely.

A verification function provides a VerificationResult as follows:

$VerificationResult=fn($PreviewResult, $PurgeResult, $newQueryResult)

The verification function uses PreviewResult to validate scope (e.g., to verify that only the expected data according to the preview was purged).

The verification function uses PurgeResult to validate actions (e.g., check what was actually purged and to confirm that output from the purge verification component 214 is correct).

The verification function uses new QueryResult to validate the outcome (e.g., that the expected data was purged by checking target storage after purging).

In some cases, the verification function may be designed to take the three data sets as inputs in the form of arrays or lists of records. For example, PreviewResult may be a set of records representing the data items expected to be purged (based on retention policy criteria), PurgeResult may be a set of records actually purged, and new QueryResult may be a set of records representing remaining data items after purging.

The output of the verification function indicates whether the purge was performed according to the purge policy. For example, the output may be a Boolean value. The output may also indicate, in the case of a flawed purge, whether the purge was incomplete or incorrect, as defined herein.

At decision operation 916, the purge verification component 214 checks whether the hard purge of the first batch of data items was executed in line with the purge policy. For example, the decision operation 916 may check the outcome of the verification function. If the output is "True," the purge verification component 214 instructs the purging component 212 to proceed with the data purging process in the normal way. For example, the purging component 212 may designate the first batch as finalized and move on to the purging of a second batch of data items (operation 924). It will be appreciated that similar verification operations may be performed for subsequent batches.

On the other hand, if, at decision operation 916, the purge verification component 214 determines that the hard purge was flawed (e.g., if the output is "False"), the data purging system 128 adjusts the state of the data purging process to an error state and proceeds to identify an error correction operation. Specifically, the method 900 proceeds to decision operation 918, where the purge verification component 214 checks whether the hard purge was incomplete or incorrect.

The verification function may indicate whether the hard purge was incomplete or incorrect. Alternatively, the purge verification component 214 may perform a further check to determine the nature of the flawed hard purge.

If the purge verification component 214 identifies that the hard purge was incomplete, the purge verification component 214 may identify the missed data items (e.g., those that should have been hard purged as part of the first batch) and cause the purging component 212 to retry the hard purge for those missed data items (operation 920). In some examples, the purging engine 204 is configured to only retry a purging operation a predetermined number of times in order to save computing resources. For example, the purging engine 204 may only perform a retry once per batch or once per job. If the retry fails (e.g., during operation 920), a notification (e.g., alert message) may be sent to the administrator device 114. For example, the alert message may inform the administrator device 114 of the failure to process the particular request and indicate that the administrator 112 should investigate the root cause of the failure and complete the purging manually.

If the purge verification component 214 identifies that the hard purge was incorrect, the purge verification component 214 instructs the purging component 212 to halt further purging within the data purging process associated with the specific purge policy or purge job (operation 922). The purging engine 204 may also transmit a notification of the error (e.g., to the administrator device 114 via the purge request and monitoring interface 216 of FIG. 2). This allows an administrator (e.g., the administrator 112 of FIG. 1) to intervene.

As mentioned, robust verification may be enabled by isolating a main purging job from a validation or verification thread. In some cases, upon detecting an erroneous or flawed purge, the purge verification component 214 may initiate a hard stop of the data purging process. In this way, the purge verification component 214 prevents possible similar errors occurring with respect to further data items, such as those in subsequent batches. By dealing with data items in batches, errors can therefore be detected early (e.g., in real-time or during a "live" purging process) and further errors can be limited. The method 900 concludes at closing loop element 926.

Examples described herein thus provide for automatic detection of incorrect or incomplete data purging operations. In some examples, data items may be automatically restored or recovered (e.g., in the two-step purge mode). The technique may also allow for incomplete purges to be automatically retried. Incomplete purges may be automatically retried in both the two-step purge mode and in the preview validation mode.

In some examples, a customized purging platform can be provided that has enhanced resilience against errors or data corruption. The purging platform may provide one or more of specific modes (e.g., switchable between the two-step purge mode and the preview validation mode), automated verification, preview generation, and error correction to improve overall system reliability or efficiency.

In view of the above-described implementations of subject matter this application discloses the following list of examples, wherein one feature of an example in isolation or more than one feature of an example, taken in combination and, optionally, in combination with one or more features of one or more further examples are further examples also falling within the disclosure of this application.

Example 1 is a system comprising: at least one memory that stores instructions; and one or more processors configured by the instructions to perform operations comprising: executing a first subprocess of a data purging process to purge a plurality of data items; accessing purge result data indicative of a result of the first subprocess; determining, based on the purge result data, that the first subprocess was not executed in accordance with a purge policy associated with the data purging process; in response to determining that the first subprocess was not executed in accordance with the purge policy, adjusting a state of the data purging process; and executing a second subprocess of the data purging process according to the adjusted state.

In Example 2, the subject matter of Example 1 includes, wherein the first subprocess comprises a soft purge of the plurality of data items.

In Example 3, the subject matter of Example 2 includes, wherein the soft purge comprises marking, in one or more target storage locations associated with the data purging process, the plurality of data items as deleted without permanently removing the plurality of data items, and wherein the accessing of the purge result data comprises accessing the one or more target storage locations subsequent to the execution of the first subprocess.

In Example 4, the subject matter of any of Examples 2-3 includes, wherein the second subprocess comprises reversing the soft purge.

In Example 5, the subject matter of any of Examples 2-4 includes, the operations further comprising: disabling a third subprocess of the data purging process prior to execution of the third subprocess, the third subprocess comprising a hard purge of the plurality of data items.

In Example 6, the subject matter of any of Examples 1-5 includes, wherein the determining that the first subprocess was not executed in accordance with the purge policy comprises detecting, based on the purge result data, that one or more of the plurality of data items were incorrectly purged.

In Example 7, the subject matter of any of Examples 1-6 includes, wherein the determining that the first subprocess was not executed in accordance with the purge policy comprises detecting, based on the purge result data, that the plurality of data items constitutes an incomplete set.

In Example 8, the subject matter of any of Examples 1-7 includes, wherein the first subprocess comprises a hard purge of the plurality of data items.

In Example 9, the subject matter of Example 8 includes, wherein the plurality of data items is a first batch of data items, the determining that the first subprocess was not executed in accordance with the purge policy comprises detecting, based on the purge result data, that one or more data items in the first batch of data items were incorrectly purged, and the second subprocess comprises: disabling a third subprocess of the data purging process prior to execution of the third subprocess, the third subprocess comprising a hard purge of a second batch of data items.

In Example 10, the subject matter of any of Examples 8-9 includes, the operations further comprising: prior to the execution of the first subprocess, accessing one or more target data sources identified by the purge policy to generate pre-purge preview data indicative of an expected result of the first subprocess; and subsequent to the execution of the first subprocess: receiving the purge result data from a processor-implemented purging component that executed the first subprocess, and accessing the one or more target data sources to generate post-purge verification data, wherein the determining that the first subprocess was not executed in accordance with the purge policy is based on the pre-purge preview data, the purge result data, and the post-purge verification data.

In Example 11, the subject matter of any of Examples 8-10 includes, wherein the determining that the first subprocess was not executed in accordance with the purge policy comprises detecting, based on the purge result data, that the plurality of data items constitutes an incomplete set, and the second subprocess comprises: identifying, based on the purge policy, one or more additional data items missing from the plurality of data items; and causing the first subprocess to be retried with respect to the one or more additional data items.

In Example 12, the subject matter of any of Examples 1-11 includes, the operations further comprising: initiating the data purging process based on the purge policy, the purge policy identifying one or more target data sources and at least one retention period for each target data source.

In Example 13, the subject matter of any of Examples 1-12 includes, wherein the adjusted state of the data purging process is an error state, the second subprocess comprising performing an error correction operation that corresponds to the error state.

In Example 14, the subject matter of Example 13 includes, the second subprocess comprising: causing transmission of a notification to a user device, the notification being indicative of the error state.

Example 15 is a method comprising: executing a first subprocess of a data purging process to purge a plurality of data items; accessing purge result data indicative of a result of the first subprocess; determining, based on the purge result data, that the first subprocess was not executed in accordance with a purge policy associated with the data purging process; in response to determining that the first subprocess was not executed in accordance with the purge policy, adjusting a state of the data purging process; and executing a second subprocess of the data purging process according to the adjusted state.

In Example 16, the subject matter of Example 15 includes, wherein the first subprocess comprises a soft purge of the plurality of data items.

In Example 17, the subject matter of Example 16 includes, wherein the second subprocess comprises reversing the soft purge.

Example 18 is a non-transitory computer-readable medium that stores instructions that, when executed by one or more processors, cause the one or more processors to perform operations comprising: executing a first subprocess of a data purging process to purge a plurality of data items; accessing purge result data indicative of a result of the first subprocess; determining, based on the purge result data, that the first subprocess was not executed in accordance with a purge policy associated with the data purging process; in response to determining that the first subprocess was not executed in accordance with the purge policy, adjusting a state of the data purging process; and executing a second subprocess of the data purging process according to the adjusted state.

In Example 19, the subject matter of Example 18 includes, wherein the first subprocess comprises a soft purge of the plurality of data items.

In Example 20, the subject matter of Example 19 includes, wherein the second subprocess comprises reversing the soft purge.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

Figure 10:
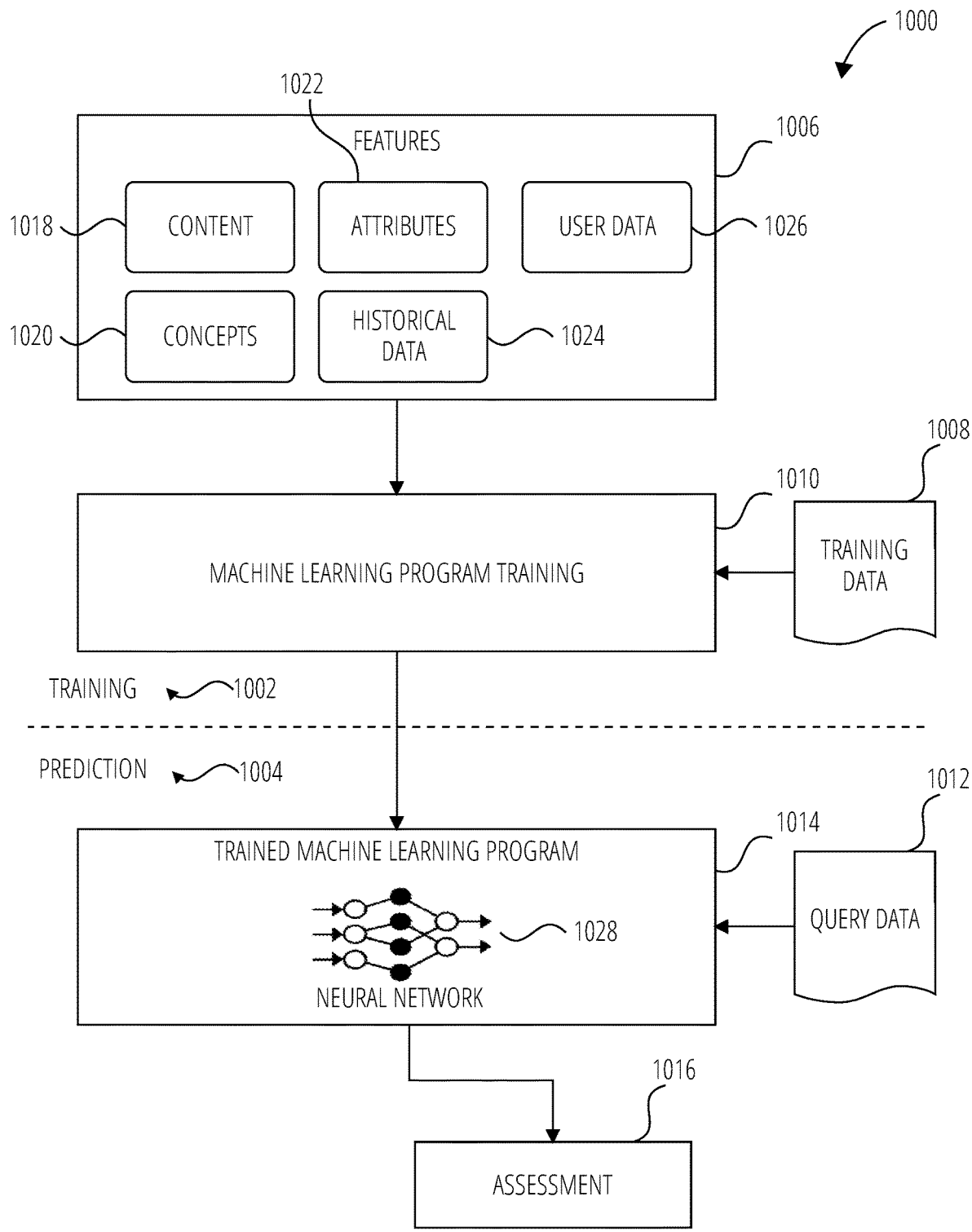
FIG. 10 diagrammatically illustrates training and use of a machine learning program, according to some examples.

FIG. 10 is a block diagram showing a machine learning program 1000, according to some examples. Machine learning programs, also referred to as machine learning algorithms or tools, may be used as part of the systems described herein to perform one or more operations. For example, and without limitation, machine learning tools may be used to detect purging errors (e.g., detect incomplete or incorrect purges), divide data items into batches for purging, predict causes of errors, or predict suitable error correction operations.

Machine learning is a field of study that gives computers the ability to learn without being explicitly programmed. Machine learning explores the study and construction of algorithms, also referred to herein as tools, that may learn from or be trained using existing data and make predictions about or based on new data. Such machine learning tools operate by building a model from example training data 1008 in order to make data-driven predictions or decisions expressed as outputs or assessments (e.g., assessment 1016). Although examples are presented with respect to a few machine learning tools, the principles presented herein may be applied to other machine learning tools.

In some examples, different machine learning tools may be used. For example, Logistic Regression (LR), Naive-Bayes, Random Forest (RF), neural networks (NN), transformers, matrix factorization, and Support Vector Machines (SVM) tools may be used.

Two common types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number).

The machine learning program 1000 supports two types of phases, namely training phases 1002 and prediction phases 1004. In training phases 1002, supervised learning, unsupervised or reinforcement learning may be used. For example, the machine learning program 1000 (1) receives features 1006 (e.g., as structured or labeled data in supervised learning) and/or (2) identifies features 1006 (e.g., unstructured or unlabeled data for unsupervised learning) in training data 1008. In prediction phases 1004, the machine learning program 1000 uses the features 1006 for analyzing query data 1012 to generate outcomes or predictions, as examples of an assessment 1016.

In the training phase 1002, feature engineering is used to identify features 1006 and may include identifying informative, discriminating, and independent features for the effective operation of the machine learning program 1000 in pattern recognition, classification, and regression. In some examples, the training data 1008 includes labeled data, which is known data for pre-identified features 1006 and one or more outcomes. Each of the features 1006 may be a variable or attribute, such as individual measurable property of a process, article, system, or phenomenon represented by a data set (e.g., the training data 1008). Features 1006 may also be of different types, such as numeric features, strings, and graphs, and may include one or more of content 1018, concepts 1020, attributes 1022, historical data 1024 and/or user data 1026, merely for example.

The concept of a feature in this context is related to that of an explanatory variable used in statistical techniques such as linear regression. Choosing informative, discriminating, and independent features is important for the effective operation of the machine learning program 1000 in pattern recognition, classification, and regression. Features may be of different types, such as numeric features, strings, and graphs.

In training phases 1002, the machine learning program 1000 uses the training data 1008 to find correlations among the features 1006 that affect a predicted outcome or assessment 1016. With the training data 1008 and the identified features 1006, the machine learning program 1000 is trained during the training phase 1002 at machine learning program training 1010. The machine learning program 1000 appraises values of the features 1006 as they correlate to the training data 1008. The result of the training is the trained machine learning program 1014 (e.g., a trained or learned model).

Further, the training phases 1002 may involve machine learning, in which the training data 1008 is structured (e.g., labeled during pre-processing operations), and the trained machine learning program 1014 implements a relatively simple neural network 1028 capable of performing, for example, classification and clustering operations. In other examples, the training phase 1002 may involve deep learning, in which the training data 1008 is unstructured, and the trained machine learning program 1014 implements a deep neural network 1028 that is able to perform both feature extraction and classification/clustering operations.

A neural network 1028 generated during the training phase 1002, and implemented within the trained machine learning program 1014, may include a hierarchical (e.g., layered) organization of neurons. For example, neurons (or nodes) may be arranged hierarchically into a number of layers, including an input layer, an output layer, and multiple hidden layers. Each of the layers within the neural network 1028 can have one or many neurons and each of these neurons operationally computes a small function (e.g., activation function). For example, if an activation function generates a result that transgresses a particular threshold, an output may be communicated from that neuron (e.g., transmitting neuron) to a connected neuron (e.g., receiving neuron) in successive layers. Connections between neurons also have associated weights, which defines the influence of the input from a transmitting neuron to a receiving neuron.

In some examples, the neural network 1028 may also be one of a number of different types of neural networks, including a single-layer feed-forward network, an Artificial Neural Network (ANN), a Recurrent Neural Network (RNN), a symmetrically connected neural network, and unsupervised pre-trained network, a transformer network, a Convolutional Neural Network (CNN), or a Recursive Neural Network (RNN), merely for example.

During prediction phases 1004, the trained machine learning program 1014 is used to perform an assessment. Query data 1012 is provided as an input to the trained machine learning program 1014, and the trained machine learning program 1014 generates the assessment 1016 as output, responsive to receipt of the query data 1012.

Figure 11:
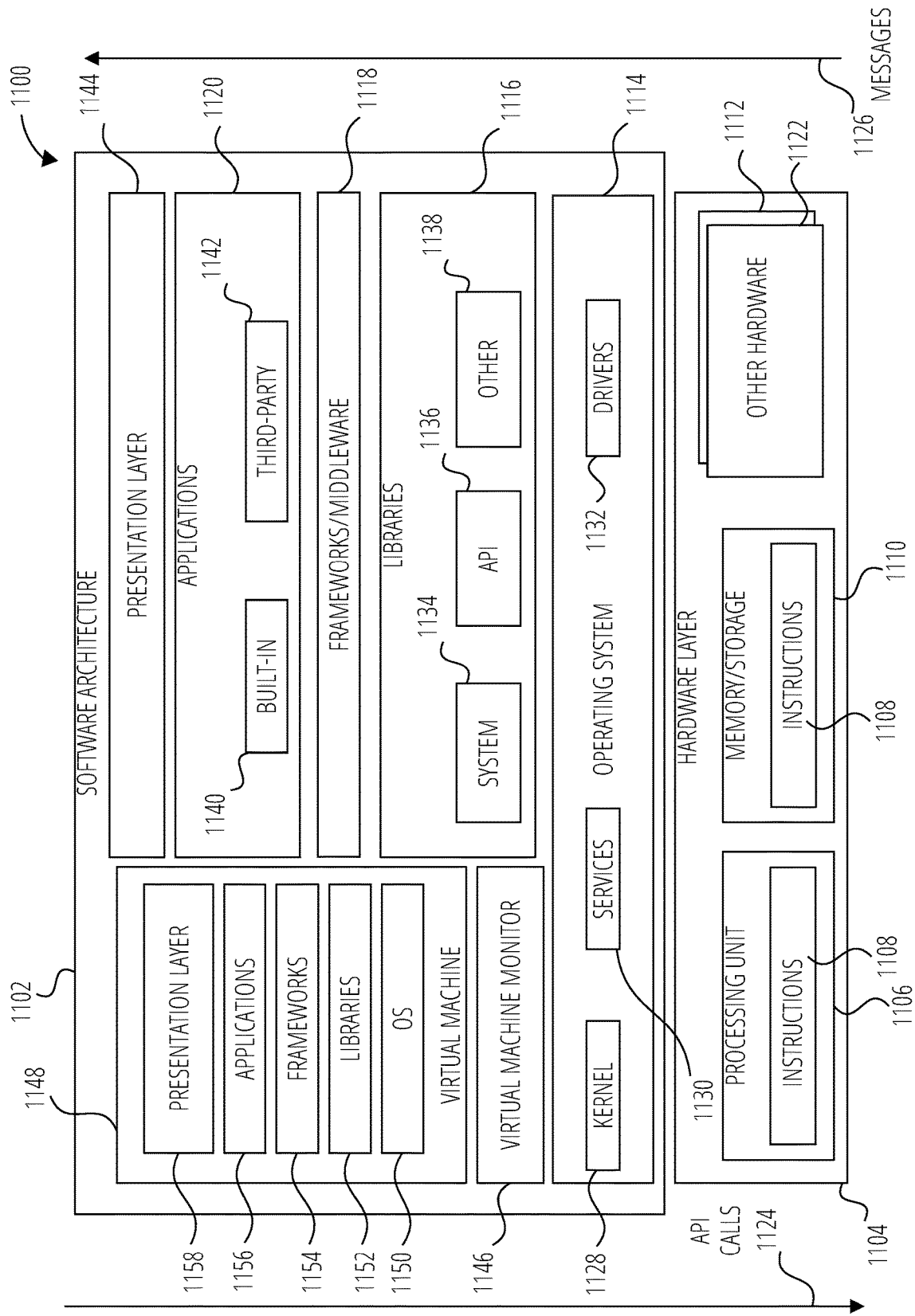
FIG. 11 is a block diagram showing a software architecture for a computing device, according to some examples.

FIG. 11 is a block diagram 1100 showing a software architecture 1102 for a computing device, according to some examples. The software architecture 1102 may be used in conjunction with various hardware architectures, for example, as described herein. FIG. 11 is merely a non-limiting illustration of a software architecture, and many other architectures may be implemented to facilitate the functionality described herein. A representative hardware layer 1104 is illustrated and can represent, for example, any of the above referenced computing devices. In some examples, the hardware layer 1104 may be implemented according to the architecture of the computer system of FIG. 12.

The representative hardware layer 1104 comprises one or more processing units 1106 having associated executable instructions 1108. Executable instructions 1108 represent the executable instructions of the software architecture 1102, including implementation of the methods, modules, subsystems, and components, and so forth described herein and may also include memory and/or storage modules 1110, which also have executable instructions 1108. Hardware layer 1104 may also comprise other hardware as indicated by other hardware 1112 and other hardware 1122 which represent any other hardware of the hardware layer 1104, such as the other hardware illustrated as part of the software architecture 1102.

In the architecture of FIG. 11, the software architecture 1102 may be conceptualized as a stack of layers where each layer provides particular functionality. For example, the software architecture 1102 may include layers such as an operating system 1114, libraries 1116, frameworks/middleware layer 1118, applications 1120, and presentation layer 1144. Operationally, the applications 1120 or other components within the layers may invoke API calls 1124 through the software stack and access a response, returned values, and so forth illustrated as messages 1126 in response to the API calls 1124. The layers illustrated are representative in nature and not all software architectures have all layers. For example, some mobile or special purpose operating systems may not provide a frameworks/middleware layer 1118, while others may provide such a layer. Other software architectures may include additional or different layers.

The operating system 1114 may manage hardware resources and provide common services. The operating system 1114 may include, for example, a kernel 1128, services 1130, and drivers 1132. The kernel 1128 may act as an abstraction layer between the hardware and the other software layers. For example, the kernel 1128 may be responsible for memory management, processor management (e.g., scheduling), component management, networking, security settings, and so on. The services 1130 may provide other common services for the other software layers. In some examples, the services 1130 include an interrupt service. The interrupt service may detect the receipt of an interrupt and, in response, cause the software architecture 1102 to pause its current processing and execute an interrupt service routine (ISR) when an interrupt is accessed.

The drivers 1132 may be responsible for controlling or interfacing with the underlying hardware. For instance, the drivers 1132 may include display drivers, camera drivers, Bluetooth® drivers, flash memory drivers, serial communication drivers (e.g., Universal Serial Bus (USB) drivers), Wi-Fi® drivers, near-field communication (NFC) drivers, audio drivers, power management drivers, and so forth depending on the hardware configuration.

The libraries 1116 may provide a common infrastructure that may be utilized by the applications 1120 or other components or layers. The libraries 1116 typically provide functionality that allows other software modules to perform tasks in an easier fashion than to interface directly with the underlying operating system 1114 functionality (e.g., kernel 1128, services 1130 or drivers 1132). The libraries 1116 may include system libraries 1134 (e.g., C standard library) that may provide functions such as memory allocation functions, string manipulation functions, mathematic functions, and the like. In addition, the libraries 1116 may include API libraries 1136 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 1116 may also include a wide variety of other libraries 1138 to provide many other APIs to the applications 1120 and other software components/modules.

The frameworks/middleware layer 1118 may provide a higher-level common infrastructure that may be utilized by the applications 1120 or other software components/modules. For example, the frameworks/middleware layer 1118 may provide various graphic user interface (GUI) functions, high-level resource management, high-level location services, and so forth. The frameworks/middleware layer 1118 may provide a broad spectrum of other APIs that may be utilized by the applications 1120 or other software components/modules, some of which may be specific to a particular operating system or platform.

The applications 1120 include built-in applications 1140 or third-party applications 1142. Examples of representative built-in applications 1140 may include, but are not limited to, a contacts application, a browser application, a book reader application, a location application, a media application, a messaging application, or a game application. Third-party applications 1142 may include any of the built-in applications as well as a broad assortment of other applications. In a specific example, the third-party application 1142 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 1142 may invoke the API calls 1124 provided by the mobile operating system such as operating system 1114 to facilitate functionality described herein.

The applications 1120 may utilize built in operating system functions (e.g., kernel 1128, services 1130 or drivers 1132), libraries (e.g., system libraries 1134, API libraries 1136, and other libraries 1138), and frameworks/middleware layer 1118 to create user interfaces to interact with users of the system. Alternatively, or additionally, in some systems, interactions with a user may occur through a presentation layer, such as presentation layer 1144. In these systems, the application/module "logic" can be separated from the aspects of the application/module that interact with a user.

Some software architectures utilize virtual machines. In the example of FIG. 11, this is illustrated by virtual machine 1148. A virtual machine creates a software environment where applications/modules can execute as if they were executing on a hardware computing device. A virtual machine is hosted by a host operating system (operating system 1114) and typically, although not always, has a virtual machine monitor 1146, which manages the operation of the virtual machine as well as the interface with the host operating system (e.g., operating system 1114). A software architecture executes within the virtual machine 1148 such as an operating system 1150, libraries 1152, frameworks/middleware 1154, applications 1156 or presentation layer 1158. These layers of software architecture executing within the virtual machine 1148 can be the same as corresponding layers previously described or may be different.

Certain examples are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In examples, one or more computer systems (e.g., a standalone, client, or server computer system) or one or more hardware processors may be configured by software (e.g., an application or application portion) as a hardware-implemented module that operates to perform certain operations as described herein.

In various examples, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner or to perform certain operations described herein. Considering examples in which hardware-implemented modules are temporarily configured (e.g., programmed), each of the hardware-implemented modules need not be configured or instantiated at any one instance in time. For example, where the hardware-implemented modules comprise, a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In examples in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some examples, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some examples, the processor or processors may be located in a single location (e.g., within a home environment, an office environment, or a server farm), while in other examples the processors may be distributed across a number of locations.

The one or more processors may also operate to support performance of the relevant operations in a "cloud computing" environment or as a "software as a service (SaaS)." For example, at least some of the operations may be performed by a group of computers (as examples of machines including processors), these operations being accessible via a network (e.g., the Internet) and via one or more appropriate interfaces (e.g., APIs).

Examples may be implemented in digital electronic circuitry, or in computer hardware, firmware, or software, or in combinations of them. Examples may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In examples, operations may be performed by one or more programmable processors executing a computer program to perform functions by operating on input data and generating output. Method operations can also be performed by, and apparatus of some examples may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In examples deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various examples.

Figure 12:
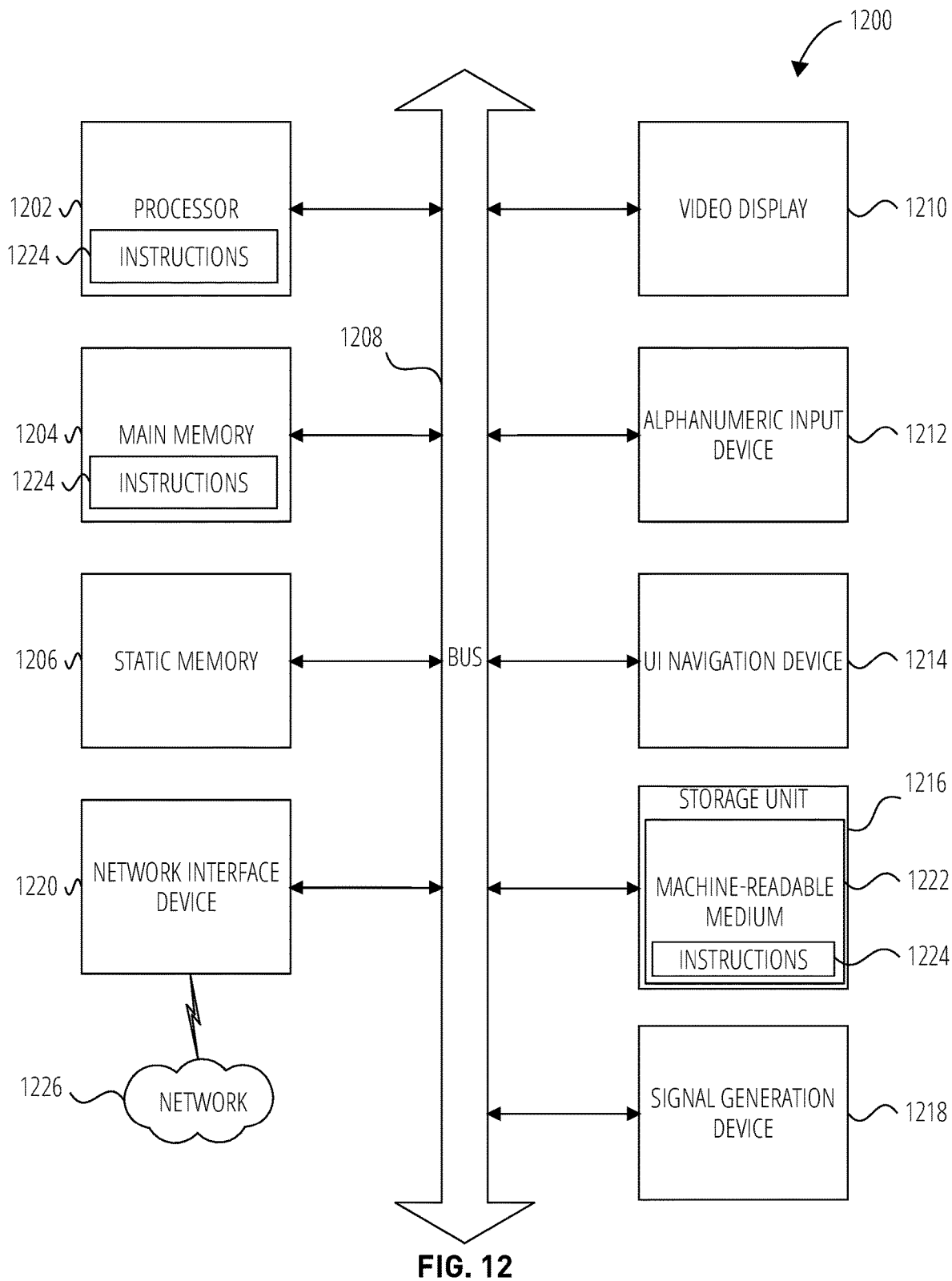
FIG. 12 is a block diagram of a machine in the form of a computer system, according to some examples, within which instructions may be executed for causing the machine to perform any one or more of the methodologies discussed herein.

FIG. 12 is a block diagram of a machine in the example form of a computer system 1200 within which instructions 1224 may be executed for causing the machine to perform any one or more of the methodologies discussed herein. In alternative examples, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., a central processing unit (CPU), a GPU, or both), a primary or main memory 1204, and a static memory 1206, which communicate with each other via a bus 1208. The computer system 1200 may further include a video display unit 1210 (e.g., a liquid crystal display (LCD) or a cathode ray tube (CRT)). The computer system 1200 also includes an alphanumeric input device 1212 (e.g., a keyboard or a touch-sensitive display screen), a UI navigation (or cursor control) device 1214 (e.g., a mouse), a storage unit 1216, a signal generation device 1218 (e.g., a speaker), and a network interface device 1220.

The storage unit 1216 includes a machine-readable medium 1222 on which is stored one or more sets of data structures and instructions 1224 (e.g., software) embodying or utilized by any one or more of the methodologies or functions described herein. The instructions 1224 may also reside, completely or at least partially, within the main memory 1204 or within the processor 1202 during execution thereof by the computer system 1200, with the main memory 1204 and the processor 1202 also each constituting a machine-readable medium 1222.

While the machine-readable medium 1222 is shown in accordance with some examples to be a single medium, the term "machine-readable medium" may include a single medium or multiple media (e.g., a centralized or distributed database, or associated caches and servers) that store the one or more instructions 1224 or data structures. The term "machine-readable medium" shall also be taken to include any tangible medium that is capable of storing, encoding, or carrying instructions 1224 for execution by the machine and that cause the machine to perform any one or more of the methodologies of the present disclosure, or that is capable of storing, encoding, or carrying data structures utilized by or associated with such instructions 1224. The term "machine-readable medium" shall accordingly be taken to include, but not be limited to, solid-state memories, and optical and magnetic media. Specific examples of a machine-readable medium 1222 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and compact disc read-only memory (CD-ROM) and digital versatile disc read-only memory (DVD-ROM) disks. A machine-readable medium is not a transmission medium.

The instructions 1224 may further be transmitted or received over a communications network 1226 using a transmission medium. The instructions 1224 may be transmitted using the network interface device 1220 and any one of a number of well-known transfer protocols (e.g., hypertext transport protocol (HTTP)). Examples of communication networks include a local area network (LAN), a wide area network (WAN), the Internet, mobile telephone networks, plain old telephone (POTS) networks, and wireless data networks (e.g., Wi-Fi and Wi-Max networks). The term "transmission medium" shall be taken to include any intangible medium that is capable of storing, encoding, or carrying instructions 1224 for execution by the machine, and includes digital or analog communications signals or other intangible media to facilitate communication of such software.

Although specific examples are described herein, it will be evident that various modifications and changes may be made to these examples without departing from the broader spirit and scope of the disclosure. Accordingly, the specification and drawings are to be regarded in an illustrative rather than a restrictive sense. The accompanying drawings that form a part hereof show by way of illustration, and not of limitation, specific examples in which the subject matter may be practiced. The examples illustrated are described in sufficient detail to enable those skilled in the art to practice the teachings disclosed herein. Other examples may be utilized and derived therefrom, such that structural and logical substitutions and changes may be made without departing from the scope of this disclosure. This detailed description, therefore, is not to be taken in a limiting sense, and the scope of various examples is defined only by the appended claims, along with the full range of equivalents to which such claims are entitled.

Such examples of the inventive subject matter may be referred to herein, individually or collectively, by the "example" merely for convenience and without intending to voluntarily limit the scope of this application to any single example or concept if more than one is in fact disclosed. Thus, although specific examples have been illustrated and described herein, it should be appreciated that any arrangement calculated to achieve the same purpose may be substituted for the specific examples shown. This disclosure is intended to cover any and all adaptations or variations of various examples. Combinations of the above examples, and other examples not specifically described herein, will be apparent to those of skill in the art upon reviewing the above description.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" and "an" are herein used, as is common in patent documents, to include one or more than one instance. As used herein, the conjunction "or" refers to a non-exclusive "or," unless specifically stated otherwise.

As used in this disclosure, phrases of the form "at least one of an A, a B, or a C," "at least one of A, B, or C," "at least one of A, B, and C," and the like, should be interpreted to select at least one from the group that comprises "A, B, and C." Unless explicitly stated otherwise in connection with a particular instance in this disclosure, this manner of phrasing does not mean "at least one of A, at least one of B, and at least one of C." As used in this disclosure, the example "at least one of an A, a B, or a C," would cover any of the following selections: {A}, {B}, {C}, {A, B}, {A, C}, {B, C}, and {A, B, C}.

Unless the context clearly requires otherwise, throughout the description and the claims, the words "comprise," "comprising," and the like are to be construed in an inclusive sense, as opposed to an exclusive or exhaustive sense, e.g., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise, the term "and/or" in reference to a list of two or more items, covers all of the following interpretations of the word: any one of the items in the list, all of the items in the list, and any combination of the items in the list.

The various features, steps, operations, and processes described herein may be used independently of one another, or may be combined in various ways. All possible combinations and subcombinations are intended to fall within the scope of this disclosure. In addition, certain method or process blocks or operations may be omitted in some implementations.

Although some examples, e.g., those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence. The term "operation" is used to refer to elements in the drawings of this disclosure for ease of reference and it will be appreciated that each "operation" may identify one or more operations, processes, actions, or steps, and may be performed by one or multiple components.

What is claimed is:

1. A system comprising:
    at least one memory that stores instructions, a purge policy associated with a data purging process, and a state of the data purging process; and
    one or more processors configured by the instructions to perform operations comprising:
        executing a first subprocess of the data purging process to purge a plurality of data items, the first subprocess comprising at least one of a soft purge of the plurality of data items or a hard purge of the plurality of data items;
        accessing purge result data indicative of a result of the first subprocess;
        determining, based on the purge result data, that the first subprocess was not executed in accordance with the purge policy associated with the data purging process, the purge policy defining at least one of purge criteria or purge timing;
        in response to determining that the first subprocess was not executed in accordance with the purge policy, automatically adjusting, in the at least one memory, the state of the data purging process to an error state; and
        executing a second subprocess of the data purging process according to the error state.

2. The system of claim 1, wherein the first subprocess comprises the soft purge of the plurality of data items.

3. The system of claim 2, wherein the soft purge comprises marking, in one or more target storage locations associated with the data purging process, the plurality of data items as deleted without permanently removing the plurality of data items, and wherein the accessing of the purge result data comprises accessing the one or more target storage locations subsequent to the execution of the first subprocess.

4. The system of claim 2, wherein the second subprocess comprises reversing the soft purge.

5. The system of claim 2, the operations further comprising:
    disabling a third subprocess of the data purging process prior to execution of the third subprocess, the third subprocess comprising a hard purge of the plurality of data items.

6. The system of claim 1, wherein the determining that the first subprocess was not executed in accordance with the purge policy comprises detecting, based on the purge result data, that one or more of the plurality of data items were incorrectly purged.

7. The system of claim 1, wherein the determining that the first subprocess was not executed in accordance with the purge policy comprises detecting, based on the purge result data, that the plurality of data items constitutes an incomplete set.

8. The system of claim 1, wherein the first subprocess comprises the hard purge of the plurality of data items.

9. The system of claim 8, wherein the plurality of data items is a first batch of data items, the determining that the first subprocess was not executed in accordance with the purge policy comprises detecting, based on the purge result data, that one or more data items in the first batch of data items were incorrectly purged, and the second subprocess comprises:
  disabling a third subprocess of the data purging process prior to execution of the third subprocess, the third subprocess comprising a hard purge of a second batch of data items.

10. The system of claim 8, the operations further comprising:
  prior to the execution of the first subprocess, accessing one or more target data sources identified by the purge policy to generate pre-purge preview data indicative of an expected result of the first subprocess; and
  subsequent to the execution of the first subprocess:
  receiving the purge result data from a processor-implemented purging component that executed the first subprocess, and
  accessing the one or more target data sources to generate post-purge verification data, wherein the determining that the first subprocess was not executed in accordance with the purge policy is based on the pre-purge preview data, the purge result data, and the post-purge verification data.

11. The system of claim 8, wherein the determining that the first subprocess was not executed in accordance with the purge policy comprises detecting, based on the purge result data, that the plurality of data items constitutes an incomplete set, and the second subprocess comprises:
  identifying, based on the purge policy, one or more additional data items missing from the plurality of data items; and
  causing the first subprocess to be retried with respect to the one or more additional data items.

12. The system of claim 1, the operations further comprising:
  initiating the data purging process based on the purge policy, the purge policy identifying one or more target data sources and at least one retention period for each target data source.

13. The system of claim 1, wherein the second subprocess comprises performing an error correction operation that corresponds to the error state.

14. The system of claim 13, the second subprocess comprising:
  causing transmission of a notification to a user device, the notification being indicative of the error state.

15. A method comprising:
  executing a first subprocess of a data purging process to purge a plurality of data items, the first subprocess comprising at least one of a soft purge of the plurality of data items or a hard purge of the plurality of data items;
  accessing purge result data indicative of a result of the first subprocess;
  determining, based on the purge result data, that the first subprocess was not executed in accordance with a purge policy associated with the data purging process, the purge policy defining at least one of purge criteria or purge timing;
  in response to determining that the first subprocess was not executed in accordance with the purge policy, automatically adjusting, in at least one memory, a state of the data purging process to an error state; and
  executing a second subprocess of the data purging process according to the error state.

16. The method of claim 15, wherein the first subprocess comprises the soft purge of the plurality of data items.

17. The method of claim 16, wherein the second subprocess comprises reversing the soft purge.

18. A non-transitory computer-readable medium that stores instructions that, when executed by one or more processors, cause the one or more processors to perform operations comprising:
  executing a first subprocess of a data purging process to purge a plurality of data items, the first subprocess comprising at least one of a soft purge of the plurality of data items or a hard purge of the plurality of data items;
  accessing purge result data indicative of a result of the first subprocess;
  determining, based on the purge result data, that the first subprocess was not executed in accordance with a purge policy associated with the data purging process, the purge policy defining at least one of purge criteria or purge timing;
  in response to determining that the first subprocess was not executed in accordance with the purge policy, automatically adjusting, in at least one memory, a state of the data purging process to an error state; and
  executing a second subprocess of the data purging process according to the error state.

19. The non-transitory computer-readable medium of claim 18, wherein the first subprocess comprises the soft purge of the plurality of data items.

20. The non-transitory computer-readable medium of claim 19, wherein the second subprocess comprises reversing the soft purge.

* * * * *